US012339530B2

(12) United States Patent
Apisdorf et al.

(10) Patent No.: US 12,339,530 B2
(45) Date of Patent: Jun. 24, 2025

(54) SCALABLE AND PROGRAMMABLE COHERENT WAVEFORM GENERATORS

(71) Applicant: IonQ, Inc., College Park, MD (US)

(72) Inventors: Joel Zvi Apisdorf, Reston, VA (US); James Michael Williams, Annapolis, MD (US); Phillip Douglas Solomon, Washington, DC (US); Jason Madjdi Amini, Takoma Park, MD (US)

(73) Assignee: IonQ, Inc., College Park, MD (US)

( * ) Notice: Subject to any disclaimer, the term of this patent is extended or adjusted under 35 U.S.C. 154(b) by 0 days.

(21) Appl. No.: 18/542,331

(22) Filed: Dec. 15, 2023

(65) Prior Publication Data

US 2024/0134216 A1    Apr. 25, 2024

Related U.S. Application Data

(60) Continuation of application No. 17/738,775, filed on May 6, 2022, now Pat. No. 11,899,292, which is a
(Continued)

(51) Int. Cl.
*G02F 1/017* (2006.01)
*G02F 7/00* (2006.01)
(Continued)

(52) U.S. Cl.
CPC ............. *G02F 1/017* (2013.01); *G02F 7/00* (2013.01); *G06F 1/10* (2013.01); *G02F 1/01791* (2021.01)

(58) Field of Classification Search
CPC .. G02F 1/017; G02F 1/01808; G02F 1/01716; G02F 1/01791; G02F 7/00;
(Continued)

(56) References Cited

U.S. PATENT DOCUMENTS

| 7,579,971 B2 | 8/2009 | Washburn et al. |
| 9,847,787 B1 | 12/2017 | Fry et al. |

(Continued)

FOREIGN PATENT DOCUMENTS

| CN | 101923106 A | 12/2010 |
| CN | 107181491 A | 9/2017 |

(Continued)

OTHER PUBLICATIONS

Murphy et al, "Ask The Application Engineer—33, All About Direct Digital Synthesis"; Analog Dialogue 38-08, Aug. 2004. (Year: 2004).*

(Continued)

*Primary Examiner* — Jie Lei
(74) *Attorney, Agent, or Firm* — ARENTFOX SCHIFF LLP

(57) ABSTRACT

The disclosure describes various aspects of a system with scalable and programmable coherent waveform generators. A network and digital-to-analog conversion (DAC) cards used by the network are described where each DAC card has a clock divider/replicator device with an input SYNC pin, a digital logic component, and one or more DAC components, and each output of the DAC components is used to control optical beams for a separate qubit of a quantum information processing (QIP) system. The network also includes a first distribution network to provide a clock signal to the clock divider/replicator device in the DAC cards, and a second distribution network to provide a start signal to the DAC cards, where the start signal is used by the digital logic component in the DAC card to assert the input SYNC pin when the start signal is asserted unless it is masked by the digital logic component.

18 Claims, 13 Drawing Sheets

Related U.S. Application Data division of application No. 16/936,755, filed on Jul. 23, 2020, now Pat. No. 11,402,671.

(60) Provisional application No. 62/877,979, filed on Jul. 24, 2019.

(51) Int. Cl.
*G06F 1/10* (2006.01)
*G06N 10/00* (2022.01)

(58) Field of Classification Search
CPC . G02F 1/113; G02F 1/116; G02F 1/33; G06N 10/00; G06N 10/20; G06N 10/40; G06F 1/10; G06F 17/14; B82Y 10/00; B82Y 20/00
USPC .............. 359/246, 237, 244, 285–287, 305
See application file for complete search history.

(56) References Cited

U.S. PATENT DOCUMENTS

| | | | |
|---|---|---|---|
| 11,402,671 B2* | 8/2022 | Apisdorf | G02F 1/017 |
| 11,635,456 B2 | 4/2023 | Ofek et al. | |
| 2019/0049495 A1 | 2/2019 | Ofek et al. | |
| 2019/0205784 A1 | 7/2019 | Monroe et al. | |

FOREIGN PATENT DOCUMENTS

| | | |
|---|---|---|
| CN | 107615876 A | 1/2018 |
| JP | 2010511946 A | 4/2010 |
| JP | 2019513249 A | 5/2019 |

OTHER PUBLICATIONS

Office Action in JP2022503991, mailed Mar. 22, 2023, 3 pages.

Wang, Ye, et al., Single-qubit quantum memory exceeding 10-minute coherence time, Nature Photoonics, 2017, 6 pages.

Keitch, Ben, et al., Programmable and scalable radio frequency pulse sequence generator for multi-quibit quantum information experiments, 2017, 11 pages.

International Search Report and Written Opinion for PCT/US2020/043454 dated Feb. 19, 2021, 15 pages.

Office Action received for Japanese Patent Application No. 2023-085227, mailed on May 28, 2024, 9 pages (4 pages of Original OA and 5 pages of English Translation).

Fujikake Yoshisu, "Control of the internal state of cryogenic atoms by electromagnetic fields", Master's Thesis [online], 2010, 11 pages.

Office Action received for Chinese Patent Application No. 202080055470.1, mailed on Aug. 26, 2024, 13 pages (7 pages of Original OA and 6 pages of English Translation).

* cited by examiner

SCALABLE AND PROGRAMMABLE COHERENT WAVEFORM GENERATORS

CROSS-REFERENCE TO RELATED APPLICATIONS

This application is a continuation of U.S. application Ser. No. 17/738,775, filed May 6, 2022, which is a divisional application of U.S. application Ser. No. 16/936,755, filed Jul. 23, 2020, now issued as U.S. Pat. No. 11,402,671, which claims the benefit of U.S. Provisional Application No. 62/877,979, filed Jul. 24, 2019, the disclosure of which is hereby incorporated by reference in its entirety.

BACKGROUND OF THE DISCLOSURE

Aspects of the present disclosure generally relate to waveform or signal generators, and more specifically, to scalable and programmable coherent waveform generators implemented for quantum information processing (QIP) systems.

Trapped atoms (or atomic ions) are one of the leading implementations for quantum information processing, where superconducting devices is another possible implementation. Atomic-based qubits can be used as quantum memories, as quantum gates in quantum computers and simulators, and can act as nodes for quantum communication networks. These atoms or atomic ions are at least partially controlled during various operations in a QIP system, including the performance of quantum algorithms/calculations and quantum simulations, by having modulated optical beams applied to them. These optical beams are in turn at least partially controlled by radio frequency (RF) signals provided to acousto-optic modulators (AOMs) that are used to modulate the optical beams. It is important that the electronics that drive the RF signals are well synchronized and have tightly controlled phase relationships to ensure correct operation across the multiple qubits in the system. When the number of trapped atoms or atomic ions that are available in the QIP system scales up (e.g., increases), the QIP system needs to be able to maintain the synchronization and phase relationships of the RF signals even as more electronics are needed to handle additional RF signals and optical beams for the additional number of trapped atoms or atomic ions.

Moreover, these electronics need to operate in an efficient manner to ensure that the RF signals have the appropriate waveforms that are applied to the trapped atoms or atomic ions using the optical beams. Since the waveforms of the RF signals are typically generated by digital-to-analog converters (DACs), it is therefore desirable that these DACs are configured not only for scalability but also to operate in a manner that overcomes latencies such as those introduced by having the waveform information be provided by streaming from a network host.

Accordingly, it is desirable to develop and implement techniques that allow for the scalability and programmability of coherent waveform or signal generators (e.g., DDSs) for use in different types of systems, including QIP systems.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

The disclosure describes techniques related to scaling and programming of waveform or signal generators (e.g., direct digital synthesizers (DDSs)). More specifically, the disclosure describes techniques related to scaling and programming of waveform or signal generators for quantum information processing (QIP) systems.

In an aspect of the disclosure, a network is described for synchronizing a plurality of digital-to-analog converter (DAC) cards in a QIP system. The network includes the DAC cards, where each DAC card has a clock divider/replicator having an input synchronization (SYNC) pin, a digital logic component, and one or more DAC components, wherein each of the outputs of the DAC components is used to control one or more optical beams for a separate qubit of the QIP system. The network further includes a first distribution network to provide a clock signal to the clock divider/replicator in each of the plurality of DAC cards, and a second distribution network to provide a central start signal to each of the plurality of DAC cards. For each of the plurality of DAC cards, the central start signal is used by the digital logic component in the DAC card to assert the input SYNC pin of the clock divider/replicator of the DAC card in response to the central start signal being asserted unless the central start signal is masked by the digital logic component.

In another aspect of the disclosure, a DAC card is described for controlling qubits in a QIP system. The DAC card may include a digital logic component having one or more direct digital synthesizers (DDSs) for each output of the DAC card, wherein each output controls one or more optical beams for a separate qubit of the QIP system, and a pair of tables that collectively provide commands to the one or more DDSs, a first table of the pair of tables being a function table and the second table of the pair of tables being an instruction table, the function table defining a parametrized function to be generated by the one or more DDSs and the instructions table defining subroutine calls to the function table or conditional loop instructions for the function table. The DAC card may further include one or more DAC components, where each DAC component providing one or more of the outputs of the DAC card, and where each DAC component receiving the parametrized function generated by the one or more DDSs to generate the one or more outputs, wherein the parametrize function is in digital form and the one or more outputs are in analog form.

Described herein are methods, apparatuses, and computer-readable storage medium for various aspects associated with the implementation of the techniques for scaling and programming of waveform or signal generators.

BRIEF DESCRIPTION OF THE DRAWINGS

The appended drawings illustrate only some implementation and are therefore not to be considered limiting of scope.

DETAILED DESCRIPTION

The detailed description set forth below in connection with the appended figures is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As described above, trapped atoms may be used to implement quantum information processing. Atomic-based qubits can be used as different type of devices, including but not limited to quantum memories, quantum gates in quantum computers and simulators, and nodes for quantum communication networks. Qubits based on trapped atomic ions can have very good coherence properties, can be prepared and measured with nearly 100% efficiency, and can be readily entangled with each other by modulating their Coulomb interaction with suitable external control fields such as optical or microwave fields. As used in this disclosure, the terms "atomic ions," "atoms," and "ions" may be used interchangeably to describe the particles that are to be confined, or are actually confined, in a trap to form a crystal or similar arrangement or configuration, and which are used as qubits in quantum computations and simulations. This disclosure describes techniques that allow for the scalability and programmability of coherent waveform or signal generators (e.g., DDSs) for use in different types of systems that are based on atomic qubits, including QIP systems.

The typical ion trap geometry or structure used for quantum information and metrology purposes is the linear radio frequency (RF) Paul trap (also referred to as an RF trap, surface trap, or simply a Paul trap), where nearby electrodes hold static and dynamic electrical potentials that lead to an effective inhomogeneous harmonic confinement of the ions. The RF Paul trap is a type of trap that uses electric fields to trap or confine charged particles in a particular region, position, or location. When atomic ions are laser-cooled to very low temperatures in such a trap, the atomic ions form a stationary crystal of qubits (e.g., a structured arrangement of qubits), with Coulomb repulsion balancing the external confinement force. For sufficient trap anisotropy, the ions can form a crystal along the weak direction of confinement, and this is the arrangement typically employed for applications in quantum information and metrology.

Figure 1A:
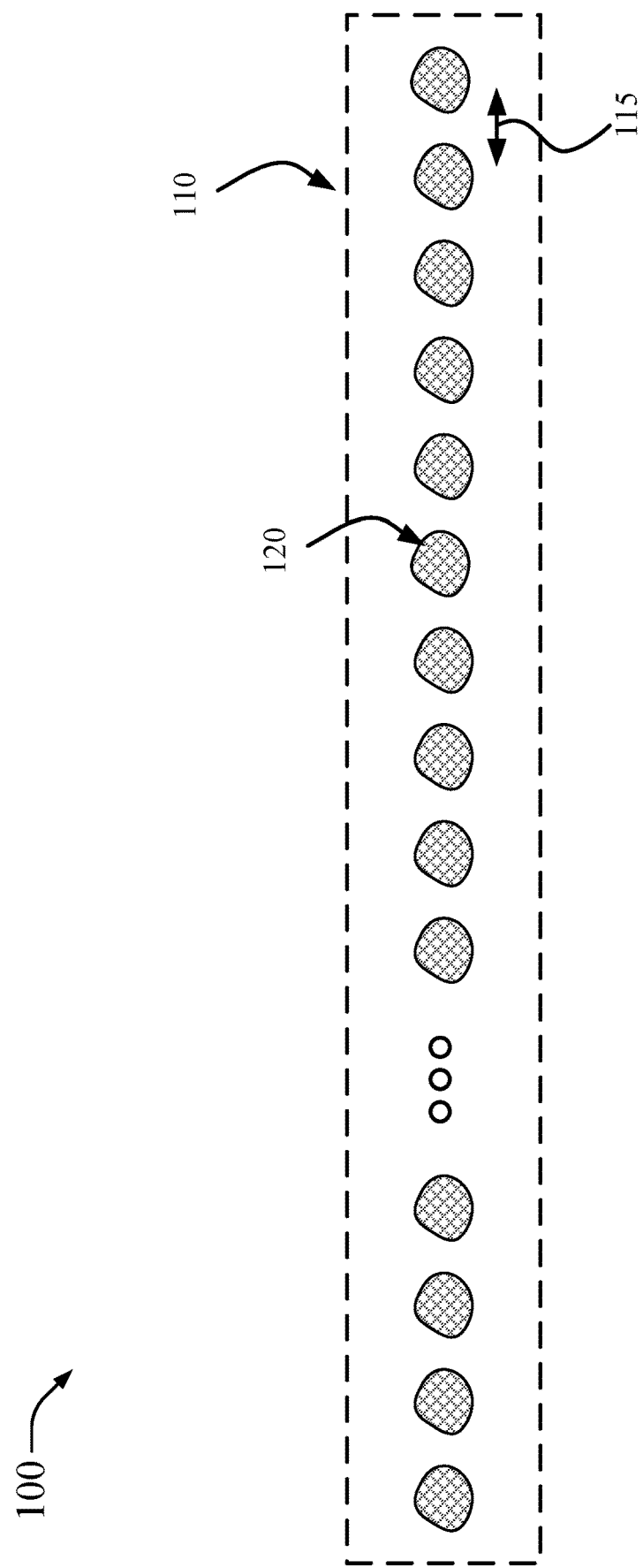
FIG. 1A illustrates a view of a vacuum chamber that houses electrodes for the trapping of atomic ions a crystal in accordance with aspects of the disclosure.

FIG. 1A illustrates a diagram 100 representing the trapping of atomic ions in a crystal 110 using, for example, a linear trap (by using electrodes inside a vacuum chamber) such as a linear RF Paul trap. The crystal 110 can be a linear crystal or linear lattice, for example. In the example shown in FIG. 1A, a vacuum chamber in a quantum system can include a set of electrodes for trapping N (N≥1) atomic Ytterbium ions (e.g., $^{171}Yb^+$ ions) 120 which are confined in the crystal 110 and can be laser-cooled to be nearly at rest. The number of atomic ions trapped can be configurable. The atoms are illuminated with laser radiation tuned to a resonance in $^{171}Yb^+$ and the fluorescence of the atomic ions is imaged onto a camera. In an example, atomic ions can be separated by about 5 microns (μm) from each other, which can be verified by fluorescence. The separation of the atomic ions is determined by a balance between the external confinement force and Coulomb repulsion.

Figure 1B:
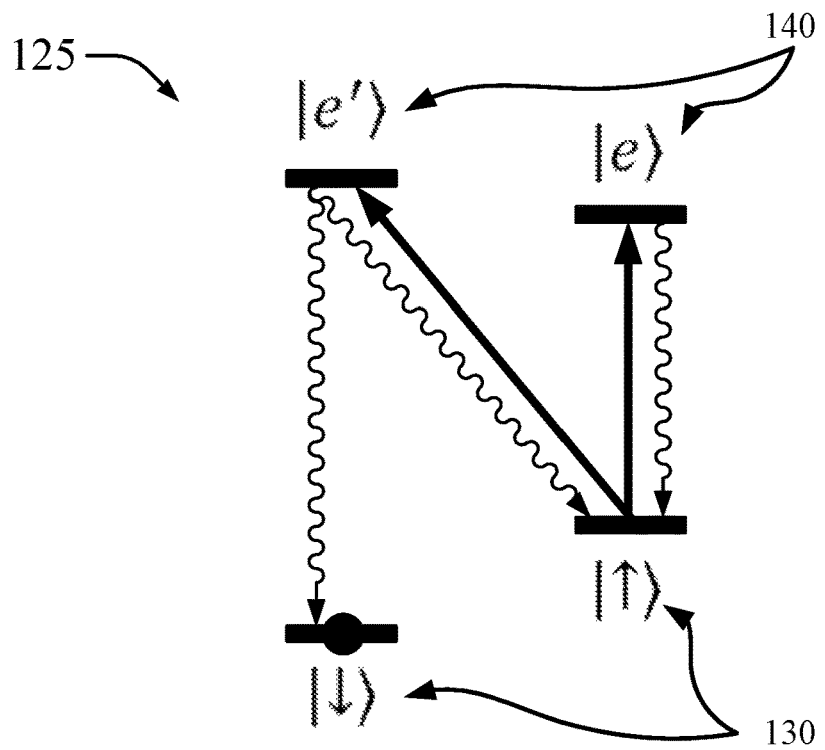
FIG. 1B is a diagram illustrating an example of a reduced energy level diagram showing the application of laser radiation (e.g., optical beams) for state initialization in accordance with aspects of the disclosure.
Figure 1C:
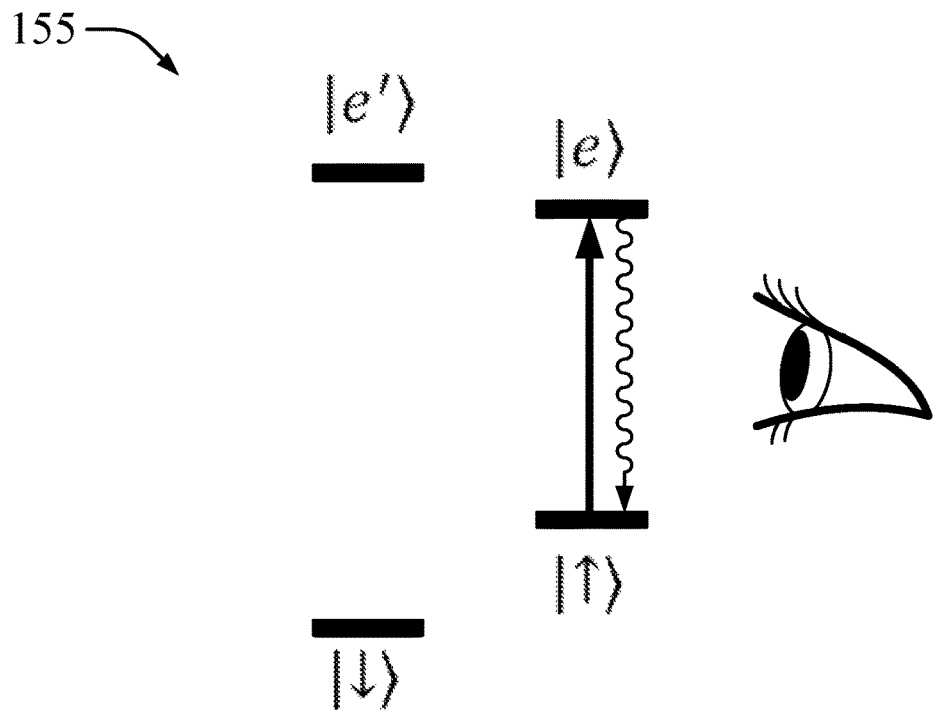
FIG. 1C is a diagram illustrating an example of a reduced energy level diagram showing the application of laser radiation (e.g., optical beams) for qubit state detection through fluorescence in accordance with aspects of the disclosure.

Strong fluorescence of individual trapped atomic ions relies on the efficient cycling of photons, thus the atomic structure of the ion must have a strong closed optical transition that allows for laser-cooling of the motion, qubit state initialization, and efficient qubit readout. This may rule out many atomic ion species, apart from simple atomic ions with a lone outer electron, such as the alkaline-earths ($Be^+$, $Mg^+$, $Ca^+$, $Sr^+$, $Ba^+$) and particular transition metals ($Zn^+$, $Hg^+$, $Cd^+$, and $Yb^+$). Within these atomic ions, quantum bits can be represented by two stable electronic levels, often characterized by an effective spin with the two states $|\uparrow\rangle$ and $|\downarrow\rangle$, or equivalently $|1\rangle$ and $|0\rangle$. FIG. 1B and FIG. 1C show the reduced energy level diagrams 125 and 155, respectively, for atomic ion $^{171}Yb^+$, where the qubit levels $|\uparrow\rangle$ and $|\downarrow\rangle$ 130 are represented by the stable hyperfine levels in the ground electronic state, and are separated by frequency $\omega_0/2\pi = 12.64$ GHz. The excited electronic states $|e\rangle$ and $|e'\rangle$ 140 in $^{171}Yb^+$ are themselves split by a smaller hyperfine coupling and are separated from the ground states by an optical interval having an energy corresponding to an optical wavelength of 369.53 nm.

Laser radiation tuned just below resonance in these optical transitions allows for Doppler laser cooling to confine the atomic ions near the bottom of the trap. Other more sophisticated forms of laser cooling can bring the atomic ions to be nearly at rest in the trap.

When a bichromatic laser or optical beam (e.g., an optical beam with two tones produced by sidebands resulting from optical modulation) resonant with both $|\uparrow\rangle \leftrightarrow |e\rangle$ and $|\downarrow\rangle \leftrightarrow |e'\rangle$ transitions is applied to the atom, it rapidly falls into the state |↓⟩) and no longer interacts with the light field, allowing the initialization of the qubit with essentially 100% fidelity (see e.g., FIG. 1B).

When a single laser beam resonant with the |↑⟩ ↔ |e⟩ transition is applied, a closed cycling optical transition causes an ion in the |↑⟩ state to fluoresce strongly while an ion in the |↓⟩ state stays dark because the laser frequency is far from its resonance (see e.g., FIG. 1C). The collection of even a small fraction of this fluorescence allows for the detection of the atomic qubit state with near-perfect efficiency or accuracy. Other atomic species may have similar initialization/detection schemes.

In FIGS. 1B and 1C, all allowed transitions from the excited electronic states |e⟩ and |e'⟩ 140 are illustrated as downward, wavy arrows. On the other hand, the applied laser radiation (which is shown as upward, straight arrows) drive these transitions for initialization to state |↓⟩ as shown in FIG. 1B, and for fluorescence detection of the qubit state (|↑⟩ =fluorescence, |↓⟩ =no fluorescence) as shown in FIG. 1C.

Performing quantum processing using the types of qubits described in FIGS. 1A-1C requires the use of laser or optical beams to control phase, frequency, amplitude, and/or polarization of quantum information in the qubits.

Figure 2A:
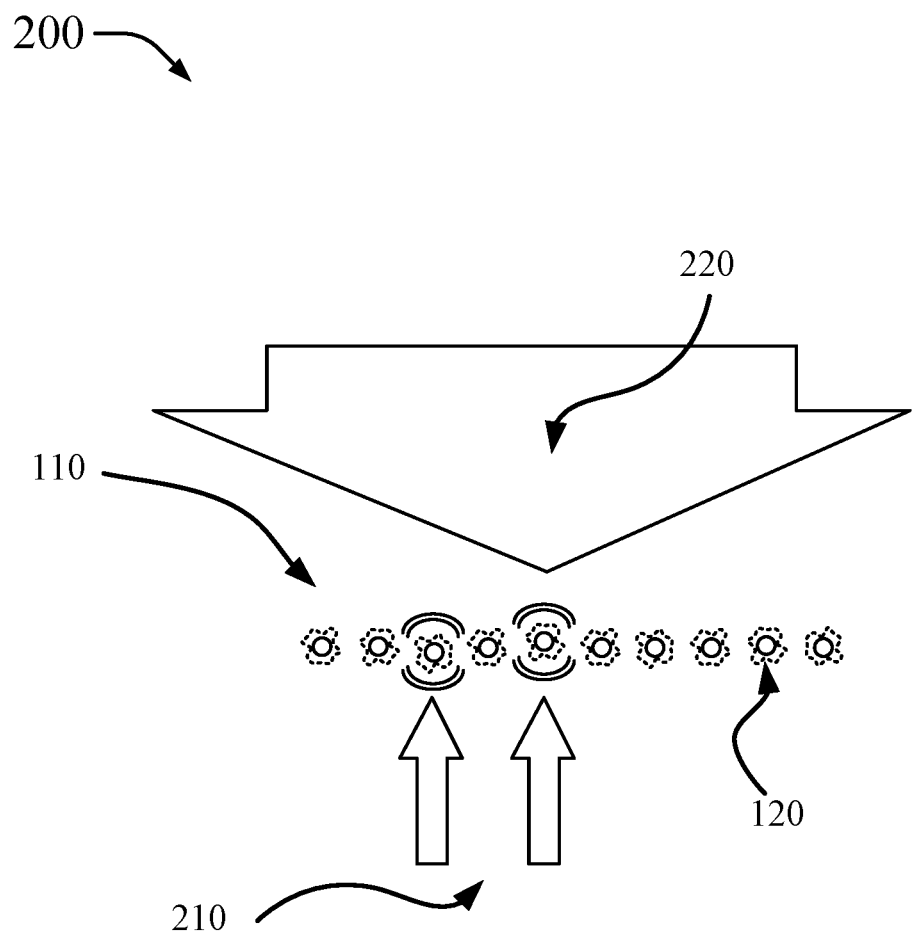
FIG. 2A is a diagram illustrating an example of Raman beam geometry in accordance with aspects of the disclosure.
Figure 2B:
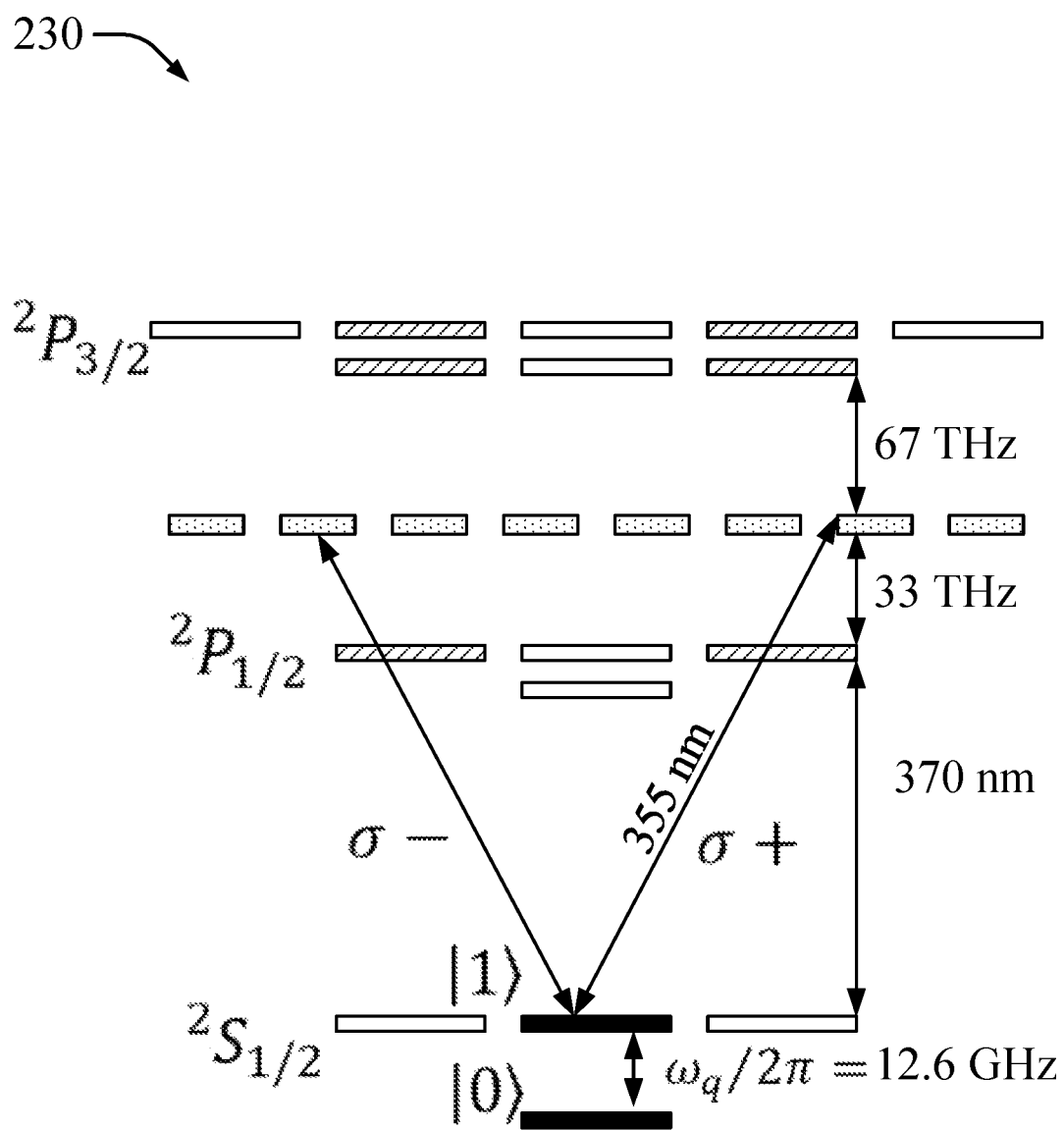
FIG. 2B is a diagram illustrating an energy level diagram showing coherent stimulated Raman transitions coupling the qubit states in accordance with aspects of the disclosure.

With respect to entangling multi-qubit operations, the motion of many trapped ions is coupled through the Coulomb interaction, much like an array of pendulums that are connected by springs. A natural way to implement entangling quantum logic gates between atomic ions in a crystal is to use the motion as an intermediary, as illustrated in FIG. 2A, which shows a diagram 200 illustrating an example of Raman beam geometry and where the application of the optical beams produces motion in the qubits. In the diagram 200, there are optical beams 210 and 220 directed to the linear lattice or crystal 110 having the atomic ion qubits 120. The optical beams in the same direction may be referred to as co-propagating optical beams and the optical beams in opposite directions may be referred to as non-co-propagating or counter-propagating optical beams. The beams 210 (co-propagating) are focused or individually addressed beams, while the beam 220 (which counter-propagates with respect to the beams 210) is an unfocused, global beam. As used herein, the terms laser beams, laser radiation, optical beams, optical radiation, beams, optical fields, and fields may be used interchangeably. In connection with FIGS. 1A-1C and 2B, a diagram 230 in FIG. 2B shows that qubit levels are separated in energy and there may be different approaches to enable transitions in the qubit levels.

In order to manipulate or control the frequency, phase, amplitude, and/or polarization of the optical beams described above, acousto-optic modulators (AOMs) are used in quantum computing and simulating applications. One or more RF signals and a laser beam are applied to the AOM and the RF signal(s) gets imprinted onto a portion of the laser beam. That portion is deflected ("diffracted") by the AOM from the unaffected beam and can be spatially separated.

Pairs of modulated beams often need to be applied simultaneously to the same atom(s) to generate the required manipulation of the quantum information. An AOM can generate multiple manipulated laser beams by applying the sum of two or more RF signals, where each RF signal is associated with a particular frequency (e.g., f1, f2, etc.). However, if the two or more laser beams have different frequencies, then the two modulated beams do not overlap after they are diffracted by the AOM. The laser beams can be "refocused" (or re-imaged) onto the atom or ion so that both beams with overlap at the atom.

Figure 3:
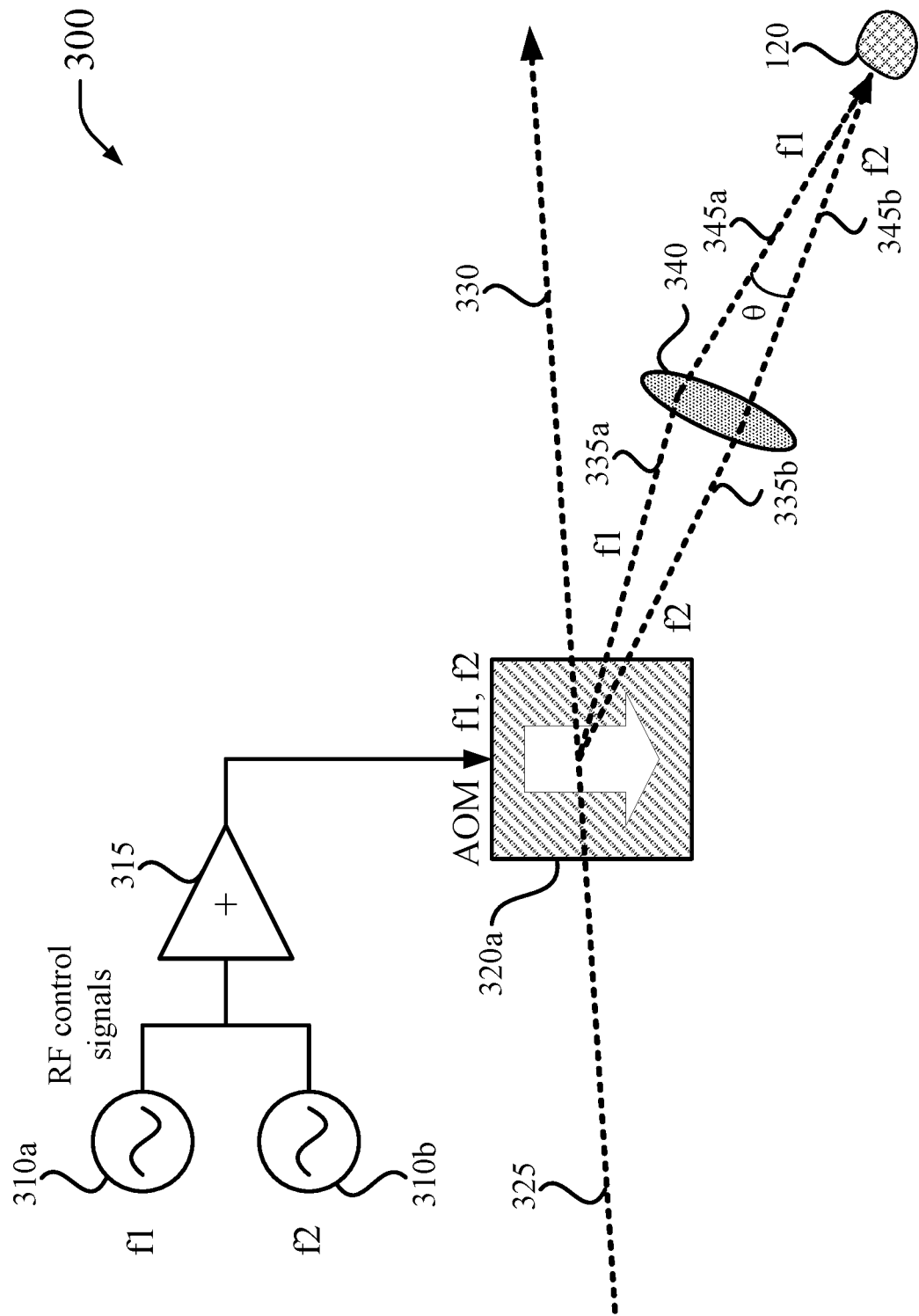
FIG. 3 is a diagram that illustrates an example of frequency dependence of diffracted laser or optical beams using acousto-optic modulators (AOMs) in accordance with aspects of this disclosure.

FIG. 3 shows a diagram 300 that illustrates an example of frequency dependence of diffracted laser or optical beams as described above. In this example, a first RF signal (e.g., a modulated signal) is generated by RF generator 310a based on frequency or tone f1 and a second RF signal is generated by RF generator 310b based on frequency or tone f2. These two signals are combined by adder 2315 and applied to AOM 320a. The RF control signals (first RF signal and second RF signal) are typically analog signals produced by an analog-to-digital converter (DAC) that converts digital waveforms into analog waveforms represented in the RF control signals.

The AOM 320a receives an incident laser beam 325, part of which is not diffracted (e.g., un-diffracted laser beam 330 produced by $0^{th}$ order diffraction). On the other hand, two modulated laser beams are generated from the incident laser beam 325 by diffraction at the AOM 320a (e.g., diffracted laser beam 335a for tone f1 and diffracted laser beam 335b for tone f2, both produced by $1^{st}$ order diffraction—higher order diffracted beams can be spatially filtered). The two diffracted laser beams are diffracted at different angles and do not co-propagate. Accordingly, the two diffracted laser beams need to be focused by optical element 340 (e.g., focused laser beam 345a for f1 and focused laser beam 345b for f2) onto a respective ion or atom 120 in a lattice or crystal 110 formed in an ion trap for quantum processing (see e.g., FIG. 1A). The refocused laser beams may not arrive at the ion or atom 120 in the same propagating direction (e.g., are not co-propagating) and techniques may be applied so that this does not cause errors in the quantum state operations.

As the quantum information processing systems scales up, that is, as the number of atoms or ions 120 increases, it is important to be able to maintain the synchronization and phase relationships of the RF signals (e.g., the RF control signals) in the various atoms or ions 120, so as to also maintain the synchronization and phase relationships when manipulating or controlling the frequency, phase, amplitude, and/or polarization of the optical beams described above.

As described above in connection with FIGS. 1A-3, trapped ion quantum information processing systems, such as quantum computers, for example, need two (2) non-parallel Raman laser beams to hit each of the atoms or atomic ions 120 in the crystal or lattice 110 with a known and stable phase relationship to similar laser beams hitting the other atoms or atomic ions 120 in the same trap. As described above, the laser beams can be at 355 nanometers when the atomic species used for the qubits is $^{171}Yb^+$, and one global beam (e.g., global beam 220 in the diagram 200 in FIG. 2A) is shared by all of the qubits.

The laser or optical beams can have a phase imprinted upon them from an electronic signal (e.g., RF control signals in the diagram 300 in FIG. 3) by using AOMs, thereby reducing the phase control from a purely optical domain to being mostly in an electronic domain. In the case of $^{171}Yb^+$ being used for qubits, a 355 nm (e.g., ultraviolet) light source can be used for generating the laser or optical beams. In some instances, the light source may be one used for commercial semiconductor photolithography and adapted or re-purposed for trapped ion quantum information processing. The original laser or optical beam produced by the light source may be split into a single global beam (e.g., global beam 220 in the diagram 200 in FIG. 2A) and multiple individual beams (e.g., beams 210 in the diagram 200 in FIG. 2A) to address each of the atoms or atomic ions 120 separately. These optical beams may then be passed through one or more AOMs as illustrated in the diagram 300 in FIG. 3, where optics may be used to widen the global beam so it can spread across all of the atoms or atomic ions 120 and to aim or focus the individual beams onto their respective atoms or atomic ions 120. In some examples, the crystal or lattice 110 may include as many as 32 or more atoms or atomic ions 120 (e.g., up to 100 or even more atoms or atomic ions 120) and the number of optical beams that are needed (and their respective electronic signals—e.g., RF control signals) will scale with the number of atoms or atomic ions 120. The example illustrated in the diagram 300 in FIG. 3 is for one AOM for each optical beam, however, it is also possible to use a multi-channel AOM, in which case a single set of optics may be sufficient to manipulate the optical beams produced by the multi-channel AOM. The electronic signals needed in the case where the qubits involve $^{171}Yb^+$ and typical AOMs are used will have a frequency between 150 MHz and 250 MHz, for example.

As described above, it is important for the electronics that are used to generate the RF signals (e.g., signal generators of the RF control signals) that drive the electrical inputs to the AOMs, to have tightly controlled phase relationships. They need not have a particular phase (e.g., 16 degrees or 567 picoseconds) relative to each other, but phase does need to be substantially fixed for the duration of a set of experiments or calculations, such that the calibration that is applied does not change. In a preferred operation, the calibration that occurred before the signal generator is eventually powered off or reset, would still be valid at a later time when that same signal generator is powered back on, or reset is released.

An aspect described in this disclosure to achieve tightly controlled phase relationships is that when multiple signal generators are used to provide RF control signal to a number of AOMs (or to a multi-channel AOM), the signal generators are configured to derive their digital clocks from a common source, so their outputs can stay in phase for longer periods, since even good oscillators that start out at the same frequency, tend to drift different amounts over the same period of time.

In another aspect of this disclosure, during the course of an experiment (e.g., a quantum calculations or algorithm) or simulation by the quantum information processing system, it may be necessary to individually vary one or more parameters of the electrical signals (e.g., waveforms) generated to control each qubit in the crystal or lattice (see e.g., crystal or lattice 110 in the diagram 100 in FIG. 1A). The statements or instructions for a particular quantum algorithm or quantum simulation that indicate how the qubits are to interact and evolve need to be compiled into a specific set of commands to the signal generators to change the parameters accordingly.

In trapped ion quantum information processing systems, there may be several different types of laser or optical beams that are used and need to be controlled: (1) a pulsed laser to transfer motion to information—for $^{171}Yb^+$ qubits this may involve ultraviolet (UV) light (e.g., 355 nm); (2) a continuous wave (CW) laser to wipe or delete information (Doppler cooling)—for $^{171}Yb^+$ qubits this may involve 369 nm+14 GHz UV light); (3) a CW laser to prepare the qubit state—for $^{171}Yb^+$ qubits this may involve 369 nm+2.105 GHz light; and (4) a CW laser to detect a qubit state—for $^{171}Yb^+$ qubits this may involve 369 nm light. In an example, a 369 nm (or approximately 370 nm) laser or optical beam may be used in the transition shown in the diagram 230 in FIG. 2B between $^2S_{1/2}$ and $^2P_{1/2}$.

Moreover, in trapped ion quantum information processing systems, algorithms or simulations typically involve one or more of following phases: (1) a coarse Doppler cooling; (2) a fine (sideband) cooling by alternating between pulsed and CW lasers; (3) preparation of all atoms or atomic ions (qubits) into a known state; (4) qubit entanglement for an algorithm or simulation using a pulsed laser (this can involve multiple steps); and (5) state detection. In such algorithms or simulations, the term "shot" may refer to running each of the phases described above, the term "experiment" may refer to running a large number of shots, for example, somewhere between 100 and 10,000 shots, the term "pulse" may refer to the actions of a signal generator during qubit entanglement in an algorithm or simulation to cause single qubit or multi-qubit coherent operations, the term "pulse duration" may refer to durations of approximately 10 μseconds (μs) for single qubit operations and of approximately 100 ids for two-qubit operations (and possibly longer when more than two qubits are involved), and the term "entanglement" may refer to having two or more qubits interact, and as long as only coherent operations are performed on the qubits, they will still be connected such that operations on one affect the other(s) qubit(s).

During state detection (phase (5) above), the atoms or atomic ions (qubits) that can be in any superposition of the |0⟩ and |1⟩ states, are collapsed into either "0" or "1" (bright or dark) classical states. The probability of detecting a "0" or "1" is controlled by the original quantum superposition, but since each shot provides only one sample per qubit, an experiments need many shots to get a large enough statistical population to estimate the original superposition with a desired level of accuracy.

As described above, signal generators are used to provide electrical signals (e.g., RF signals or RF control signals) that control laser or optical beams used in quantum operations (e.g., algorithms/calculations or simulations). Those electrical signals may control laser or optical beams through the use of AOMs. The type of signal generators described in this disclosure may be used in connection with, for example, phases (2) and (4) (fine (sideband) cooling and entanglement) described above.

In some experiments, the behavior of the signal generators (e.g., the waveforms or signals to be generated/provided, or the parameter(s) used to produce the waveforms or signals) over the course of the experiment is known before the experiment even begins. In other kinds of experiments, it may be necessary for the behavior of the signal generators to change during the experiment, based upon feedback from the experiment itself. The quantum information processing system may be configured to handle either type of experiment.

Arbitrary waveform generators (AWGs) have been used as signal generators for quantum information processing systems. AWGs are typically configured to store every output that a corresponding digital-to-analog converter (DAC) outputs over time, for as long as the experiment runs. Since that can be a lot of data, it can consume a long time to transfer the sample from the computer to the AWG(s). This "upload time" can dominate the experiment time, whether the experiment may repeat many times in a row, or whether each run of the experiment is short or limited. Therefore, systems that rely on AWGs may have limited operational speed, particularly when information to produce the samples that are provided to the AWG are streamed into the system from a host or network.

A different approach has been proposed (see e.g., Artiq project, https://m-labs.hk/artiq/), where instead of producing each sample of the waveform or signal to be used, waveform or signal parameters are specified explicitly. That is, rather than specifying each analog voltage to be produced, a few parameters are specified to describe the signal or waveform for a period of time. The advantage is that it takes less data to specify the parameters than the moment-to-moment analog voltages. When a parameter does not need to change for a given interval (e.g., frequency does not change when predominantly changing amplitude), it can be omitted from the description to save space, because the signal generator hardware knows how to free-run that frequency without outside help.

In addition, predictable changes to signal parameters (e.g., an increase in frequency by N Hz every T µs, or an increase in amplitude by M thousandths of full scale amplitude per T µs) may also be described concisely, so that the signal generator can do the correct thing without new input for some period of time. It is unlikely that these types of changes are sufficient to fully describe the desired behavior of the signal generator for a given time interval, and therefore additional parameters may need to be provided, but the advantage is that these additional parameters/changes do not need to be provided as often, so again less data needs to be pushed to the signal generator.

In general, a change indicated by a statement like "change parameter P by N steps over time T" conveys a linear equation to the signal generator. More complex equations, with higher-order terms like squaring and cubing, or beyond, can also be useful, depending on the shape that needs to be described in the waveform or signal. These ways of describing changes to a parameter are called or referred to as "splines." In the case of third order equations they are called or referred to as "cubic splines."

An example of the type of hardware (e.g., signal generator) that can be used to control a waveform or signal by indicating signal parameters and/or changes to signal parameters is a direct digital synthesis device, also referred to as a direct digital synthesizer or DDS. A DDS, for example, can generate a requested frequency indefinitely. A DDS allows for a frequency and/or phase to be specified at any time, and it very quickly changes the samples it may be feeding to a DAC to match the newly specified parameters Amplitude may not be a parameter that a DDS intrinsically allows to change (as it may typically operate at full scale amplitude), but amplitude parametric modulation can easily be handled outside the DDS, by inserting a digital multiply unit between the output of the DDS and the input of the DAC. Internally, a DDS may include of a lookup table (LUT) of sinewave DAC samples, and some mathematical capabilities to increase precision. Some examples of the mathematical capabilities of a DDS include, but need not be limited to, Taylor Series (expansions), linear interpolation, and low-pass filtering. Additional detail regarding the typical operation of a DDS device or DDS are generally available (see e.g., https://www.analog.com/en/analog-dialog ue/articles/all-about-direct-digital-synthesis.html, https://en.wikipedia.org/wiki/Direct_digital_synthesis).

DDSs may be implemented as standalone integrated circuits ("chips") or as intellectual property (IP) blocks for insertion into an integrated circuit having other processing blocks, usually where the digital logic of the DDS feeds an internal or external DAC. Such IP blocks can be used in field programmable gate arrays (FPGAs) or application specific integrated circuits (ASICs) to implement, for example, a system-on-chip (SOC) solution. For example, the Artiq project described above makes available a DDS soft IP for free. Moreover, FPGA manufacturers like Xilinx and Intel/Altera also sell DDS IP blocks, and chip manufacturer Analog Devices has open-source DDS IP blocks as well.

In some instances, it is desirable to run the digital logic of the FPGA (or ASIC) at a slower clock rate than the samples that will be output by the DAC. For example, the DAC channel might be capable of accepting 1 billion samples per seconds from the digital logic (e.g., DDS), but it may be desirable to implement and run the digital logic on an FPGA to run no faster than, for example, 250 MHz.

One approach may be to run parallel copies of the DDS at a slower clock rate. For example, instead of a single DDS, four instances of the DDS (or sub-DDSs) could be implemented and used to generate 1 billion samples per second, but each DDS is actually clocked at 250 MHz. The multiple sub-DDSs are started with phase offsets of 0, 90, 180, and 270 degrees, and all given the same frequency. Then they each sweep out a different ¼ portion of the waveform such that four (4) samples (1 from each sub-DDS) are fed to DAC per clock, usually using some small portion of the FPGA or ASIC specially designed to feed data off-chip at high rate, such as a serializer-deserializer (SERDES).

In this example, since there are four (4) instances of the DDS (e.g., four DDS IP blocks) that will use roughly four times the logic, random access memory (RAM), and clock resources inside the FPGA or ASIC, it may be preferable to run fewer instances at higher clock rates. Again using the example of 1 billion DAC samples per second, instead of using four sub-DDSs it may be preferable to use three (3) instances at 333 MHz, or two (2) instances at 500 MHz. The approach described above would still be used, just with different phase offsets: (0, 120, 240) degrees for 3 instances; (0, 180) for 2 instances. Note that when fewer gates use a clock domain, it can often run faster than the whole chip could. Dual-clock first-in-first-out (FIFOs) could be used to communicate data between the small fast clock domain and the majority of the chip which runs at the slower clock rate (perhaps 250 MHz).

Another problem that may arise in the context of quantum information processing systems is that it may not be possible to find a single FPGA or ASIC that can drive enough DAC chips to generate enough signals to control all the qubits in, for example, the crystal or lattice 110 in the diagram 100 in FIG. 1A. Or if one such FPGA is available, its cost may be prohibitive. Moreover, the time or cost necessary to construct a board using such an FPGA may also be prohibitive. In all of these cases, it may be desirable to use many separate FPGAs, possibly on separate boards, to control the totality of atoms or atomic ions (qubits) in the system. Since the system can be scalable (e.g., the number of qubits can be increased), then having a modular or scalable approach may allow for the system to be easily expanded. The outputs of all DACs across all boards will need to be synchronized, so that the relative phases of those outputs stay static, preferably across power ups and resets.

In view of the problems mentioned above, this disclosure describes various aspects or techniques to synchronize the clocks across physically separate DAC cards for use in a QIP system to control a scalable number of qubits. In one such aspect, a central or common clock may be run thru a passive splitter (e.g., a 1:N splitter) and distributed to each DAC card in the QIP system, such that the DAC cards see rising edges of the clock at the same time (see e.g., FIG. 5B). A DAC card may also be referred to as a DAC board and may include one or more DAC components (e.g., DAC integrated circuits or modules) that provide the DAC outputs (e.g., analog electrical signals) used to control laser or optical beams to manipulate qubits. One way to accomplish having all of the DAC cards see the rising edges of the clock at the same time is through the use of coaxial cables that are all the same length. In another such aspect, on the DAC card, the clock runs thru a clock divider/replicator device so that related clocks (e.g., local clocks on the DAC card) can reach both the DAC components and an attached digital logic, like an FPGA or ASIC, in which one or more DDS may be implemented (see e.g., FIGS. 4A and 4B). The clock divider/replicator device has an input SYNC pin that will hold all its outputs at a known value, and clear the internal counters that may drive some of its outputs. In yet another such aspect, a central or common start signal is also distributed to all DAC cards in the QIP system. This start signal is used to drive the DAC components and it is therefore desirable that the DAC cards get the start signal at the same time. One way to distribute the start signal with good signal integrity and fast risetime is to use low voltage differential signaling (LVDS) over shielded twinaxial cable (see e.g., FIG. 5A). One example is the Samtec C28S cable (see e.g., https://www.samtec.com/rf/components/original/bayonet-twinax). In yet another such aspect, the SYNC input pin of divider/replicator device may be driven from an output of the digital logic (e.g., FPGA/ASIC), which is programmed to assert whenever the start signal does (unless the start signal is masked) (see e.g., FIG. 4A). The FPGA/ASIC in this instance may be the same in which the DDSs are implemented.

One of the reasons for preferring a slower clock in the digital logic (e.g., FPGA or ASIC) with the DDSs is because it is easier to get all the many divider/replicator devices to clear in the same clock cycle (and hence have zero phase between their outputs) after the input clock rate is reduced from 1 GHz to 250 MHz.

The aspects and techniques described above regarding synchronizing the DAC cards and their outputs are further described in more detail below in connection with FIGS. 4A-5B.

Figure 4A:
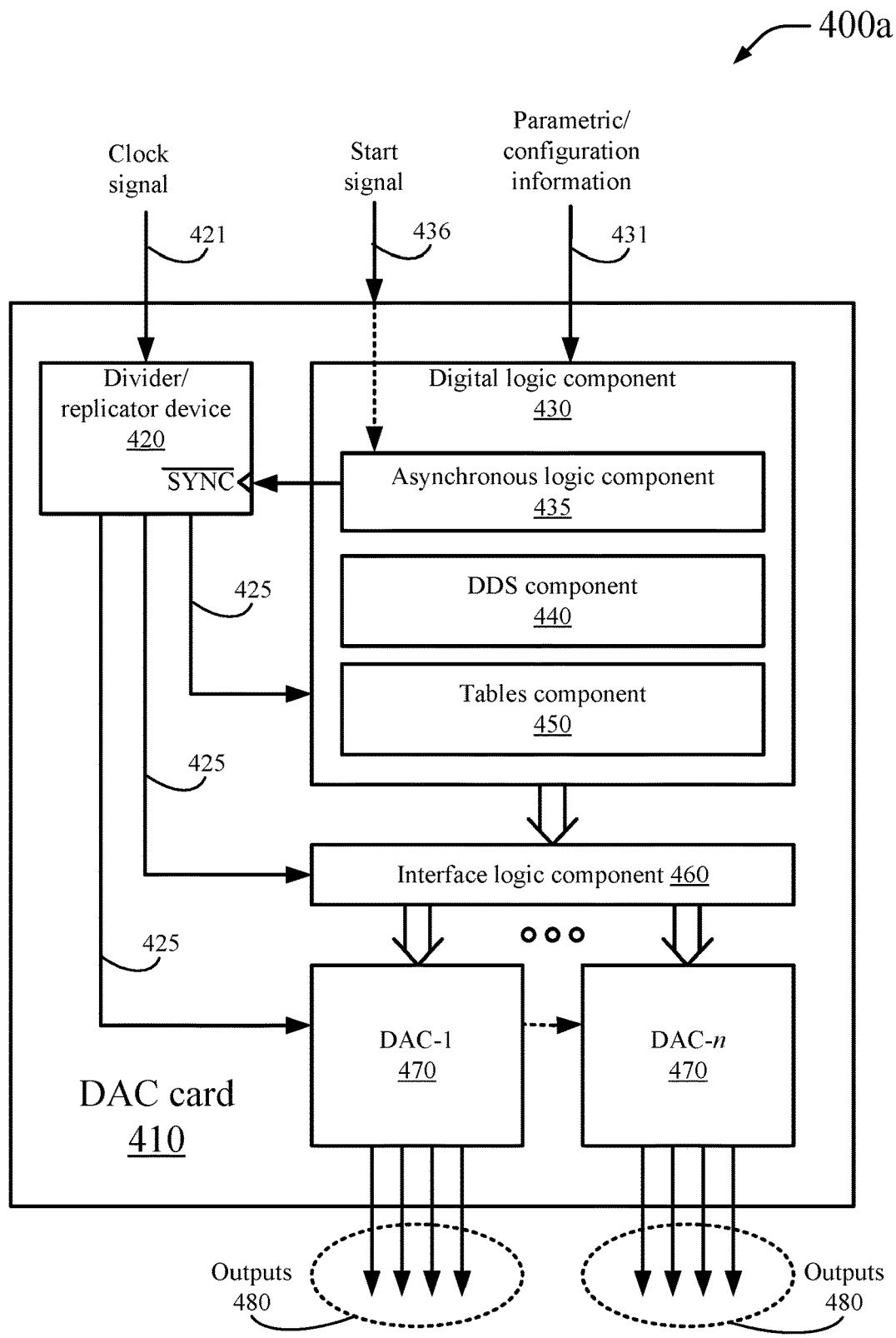
FIG. 4A illustrates an example of a digital-to-analog conversion (DAC) card in accordance with aspects of the disclosure.

FIG. 4A illustrates a diagram 400a that shows an example of a DAC board or card 410 in accordance with aspects of the disclosure. A QIP system, or some other similar system where individual operations, devices, or elements may be controlled using DAC cards, may include one or more of the DAC cards 410. Each of the outputs 480 of the DAC cards 410 is used to control separate laser or optical beam(s) used with a particular qubit in the QIP system. For example, each of the outputs 480 can include one or more waveforms or signals, such as the RF control signals applied to an AOM as described above in the diagram 300 in FIG. 3. The DAC card 410 in this example provides eight (8) outputs 480 so that this single DAC card 410 can be used to manipulate or control up to eight (8) qubits in a QIP system. For larger numbers of qubits, additional DAC cards 410 may be added to the system.

Each DAC card 410 includes a divider/replicator device 420 with a SYNC input, a digital logic component 430, an interface logic 460, and one or more DAC components 470 (e.g., DAC-1, DAC-n). Each of the DAC components 470 is configured to receive samples, that is, digital voltages representative of a digital waveform or signal, and to convert the samples into analog voltages representative of a corresponding analog waveform or signal (e.g., RF control signals). The digital waveform or signal is generated by the digital logic component 430 based on a parametrized function, and is adapted by the interface logic component 460 for compatibility with inputs to the DAC components 470.

The divider/replicator device 420 is configured to receive a clock signal 421, which may correspond to the central or common clock described above. The divider/replicator device 420 may be configured to divide down a rate of the clock signal 421 (e.g., may operate as a clock divider) or simply replicate or maintain the rate of the clock signal 421 when producing local clock signals 425. The local clock signals 425 are provided to the digital logic component 430, the interface logic 460, and/or the DAC components 470 for synchronized operation.

The digital logic component 430 may be configured to generate the samples that are provided to the DAC components 470 through the interface logic component 460. The digital logic component 430 may include an asynchronous logic component 435, a DDS component 440, and a tables component 450.

The asynchronous logic component 435 may receive a start signal 436, which may correspond to the central or common start signal described above, and may use the start signal 436 to assert the input SYNC pin of the clock divider/replicator device 420 in response to the start signal 436 being asserted, unless the start signal 436 is masked by the asynchronous logic component 435. The start signal 436 is also used to synchronize the DAC components 470 across multiple DAC cards 410. In other words, the start signal 436 serves two purposes, it provides a coordinated start for all of the DAC cards 410 in the system, in which case the start signal 436 is masked by the asynchronous logic component 435 and not provided to the divider/replicator device 420, or may be used to assert the input SYNC pin of the clock divider/replicator device 420, in which case the start signal 436 is not masked from the clock divider/replicator device 420 by the asynchronous logic component 435. The asynchronous logic component 435 may generate, based on the start signal 436, a separate signal to assert the input SYNC pin of the clock divider/replicator device 420.

Figure 4B:
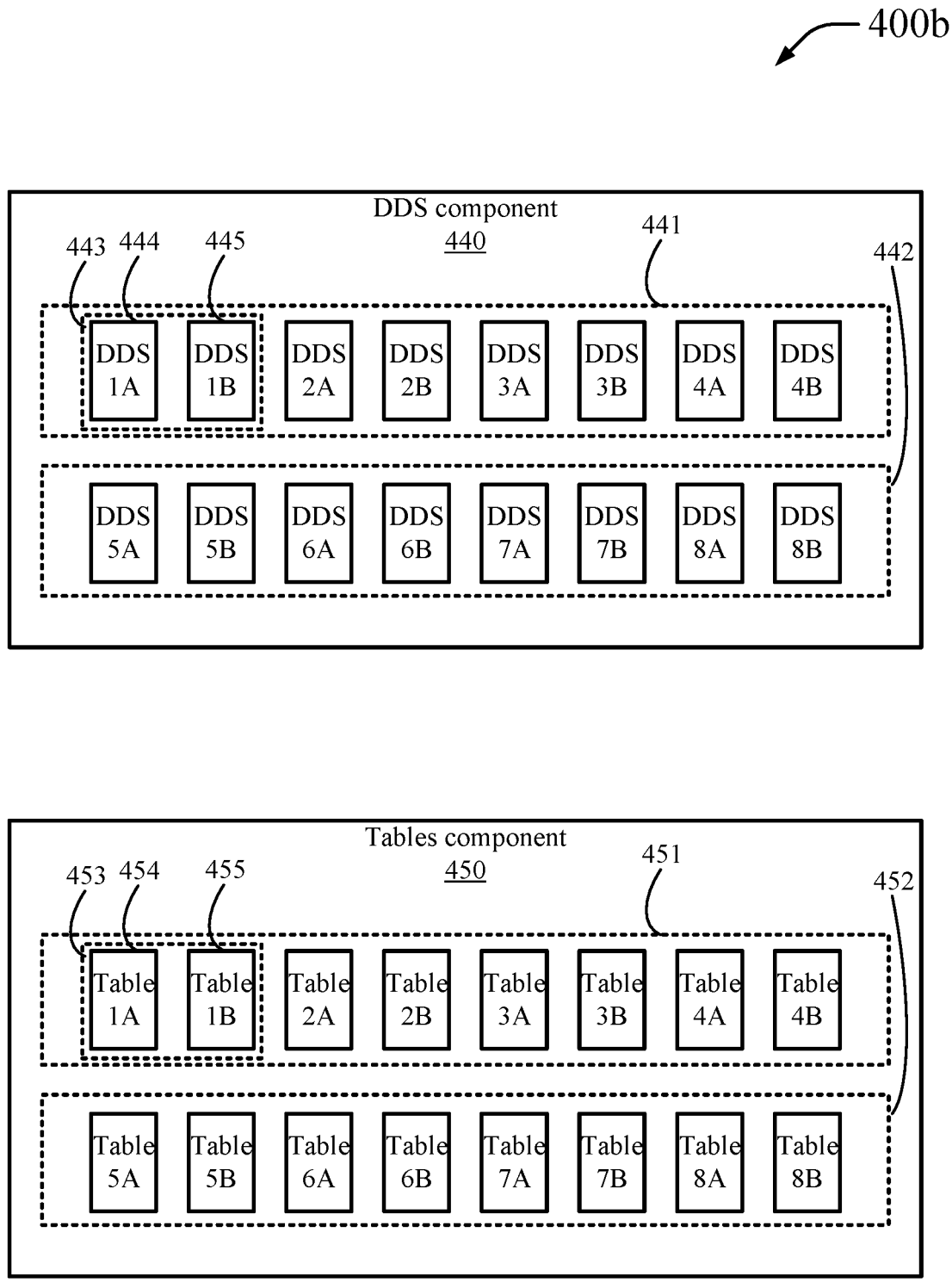
FIG. 4B illustrates an example of implementing multiple direct digital synthesizers and instructions and spline tables in a DAC card in accordance with aspects of the disclosure.

The DDS component 440 is configured to implement one or more direct digital synthesis or synthesizers (DDSs) for each output 480 of the DAC card 410 (see e.g., FIG. 4B). As mentioned above, a DDS may be a type of signal generator that can construct samples indefinitely, once it has been given phase and frequency parameters. Each of the DDSs for a particular output 480 produces a parametrized function that corresponds a digital version of the waveform or signal to be provided in analog form by the output 480. For example, the output 480 may provide two (2) RF control signals associated with the two tones (f1, f2) to be applied to an AOM as illustrated in the diagram 300 of FIG. 3. In such a case, the DDS component 440 may include two (2) DDSs for each output 480, one DDS to generate a parametrized function that is converted into the RF control signal associated with a first tone (f1), and another DDS to generate a parametrized function that is converted into the RF control signal associated with the second tone (f2). Different sets of DDSs may be implemented for the different outputs 480 of the DAC card 410.

The tables component 450 is configured to store a pair of tables for each output 480 of the DAC card 410, where the pair of tables collectively provide commands to the one or more DDSs in the DDS component 440 for that output 480. The pair of tables include a first table that is a function table and a second table that is an instructions table, where the function table defines the parametrized functions (e.g., digital samples of a waveform or signal) to be generated by each DDS and the instructions table defines subroutine calls to the function table or conditional loop instructions for the function table. In some aspects, a parametrized function defined by the function table is a spline curve. Various parameters may be used to define or characterize each of multiple segments of the spline curve, including one or more of an amplitude, a phase, or a frequency. As shown in the diagram 400a in FIG. 4A, the digital logic component 430 may receive parametric/configuration information 431 that may be used to populate and/or update parameters in the various tables stored in the tables component 450, and which are used as the basis for generating the parametrized functions by the DDSs.

Although the digital logic component 430 is described above as being implemented using an FPGA or an ASIC, it is to be understood that several of the parts or components of the DAC card 410 may be implemented in the same integrated circuit (e.g., an FPGA or ASIC). For example, the digital logic component 430 along with one or more of the divider/replicator device 420, the interface logic component 460, or the DAC components 470 may be implemented in a single integrated circuit. It is also possible to implement the entire DAC card 410 in a single integrated circuit and, in some instances, more than one DAC card 410 may be implemented in a single integrated circuit.

FIG. 4B illustrates a diagram 400b that shows an example of implementing multiple DDSs and instructions and spline tables in a DAC card such as the DAC card 410. In this example, the DAC card 410 is assumed to include two DAC components 470 (e.g., DAC-1 and DAC-2), where each of the DAC components 470 provides four (4) outputs 480 for a total of eight (8) outputs 480 for the DAC card 410. The DDS component 440 in the digital logic component 430 includes multiple DDSs to support the eight outputs 480. For example, a first set of DDSs 441 may include eight DDSs, two for each of the four outputs 480 of the first DAC component 470, and a second set of DDSs 442 may also include eight DDSs, two for each of the four outputs 480 of the second DAC component 470. A subset 443 in the set 441 corresponds to one of the four outputs 440 of the first DAC component 470. The subset 443 includes a first DDS 444 (DDS 1A) to generate a parametrized function that is used to produce a first RF control signal associated with a first tone (f1) and a second DDS 445 (DDS 1B) to generate a parametrized function that is used to produce an RF control signal associated with a second tone (f2). Similarly, DDS 2A and DDS 2B are used with a different output 480 of the first DAC component, as are DDS 3A and DDS 3B as well as DDS 4A and DDS 4B. A similar arrangement as described above is also used with the second set of DDSs 442, which includes pairs DDS 5A and DDS 5B, DDS 6A and DDS 6B, DDS 7A and DDS 7B, and DDS 8A and DDS 8B, that generate the parametrized functions that are used to produce the RF control signals in the four outputs 480 of the second DAC component 470.

The tables component 450 in the digital logic component 430 includes multiple tables to support the DDSs in the DDS component 440. For example, a first set of tables 451 may include eight tables, two for each pair of DDSs associated with the four outputs 480 of the first DAC component 470, and a second set of tables 452 may also include eight tables, two for each pair of DDSs associated with the four outputs 480 of the second DAC component 470. A subset 453 in the set 451 corresponds to the two tables used with the subset 443 of DDSs (DDS 1A and DDS 1B) in the DDS component 440. In this example, the subset 453 includes a first table 454 (Table 1A) and a second table 455 (Table 1B), where the first table 454 is a function table and the second table 455 is an instructions table. Similarly, for the rest of the tables in the set 451, Table 2A (function table) and Table 2B (instructions table) are used with DDS 2A and DDS 2B, Table 3A (function table) and Table 3B (instructions table) are used with DDS 3A and DDS 3B, and Table 4A (function table) and Table 4B (instructions table) are used with DDS 4A and DDS 4B. A similar arrangement as described above is also used with the second set of tables 452, which includes Table 5A (function table) and Table 5B (instructions table) used with DDS 5A and DDS 5B, Table 6A (function table) and Table 6B (instructions table) used with DDS 6A and DDS 6B, Table 7A (function table) and Table 7B (instructions table) used with DDS 7A and DDS 7B, and Table 8A (function table) and Table 8B (instructions table) used with DDS 8A and DDS 8B. Since the parametrized function defined by the function table may be a spline curve, the function table may also be referred to as a spline table, for example.

Each of the DDSs shown in the DDS component 440 may be a separate and distinct instantiation of a DDS IP block in an FPGA or ASIC, while each of the tables in the tables component 450 may be implemented in a separate and distinct portion of memory in the FPGA or ASIC.

Figure 4C:
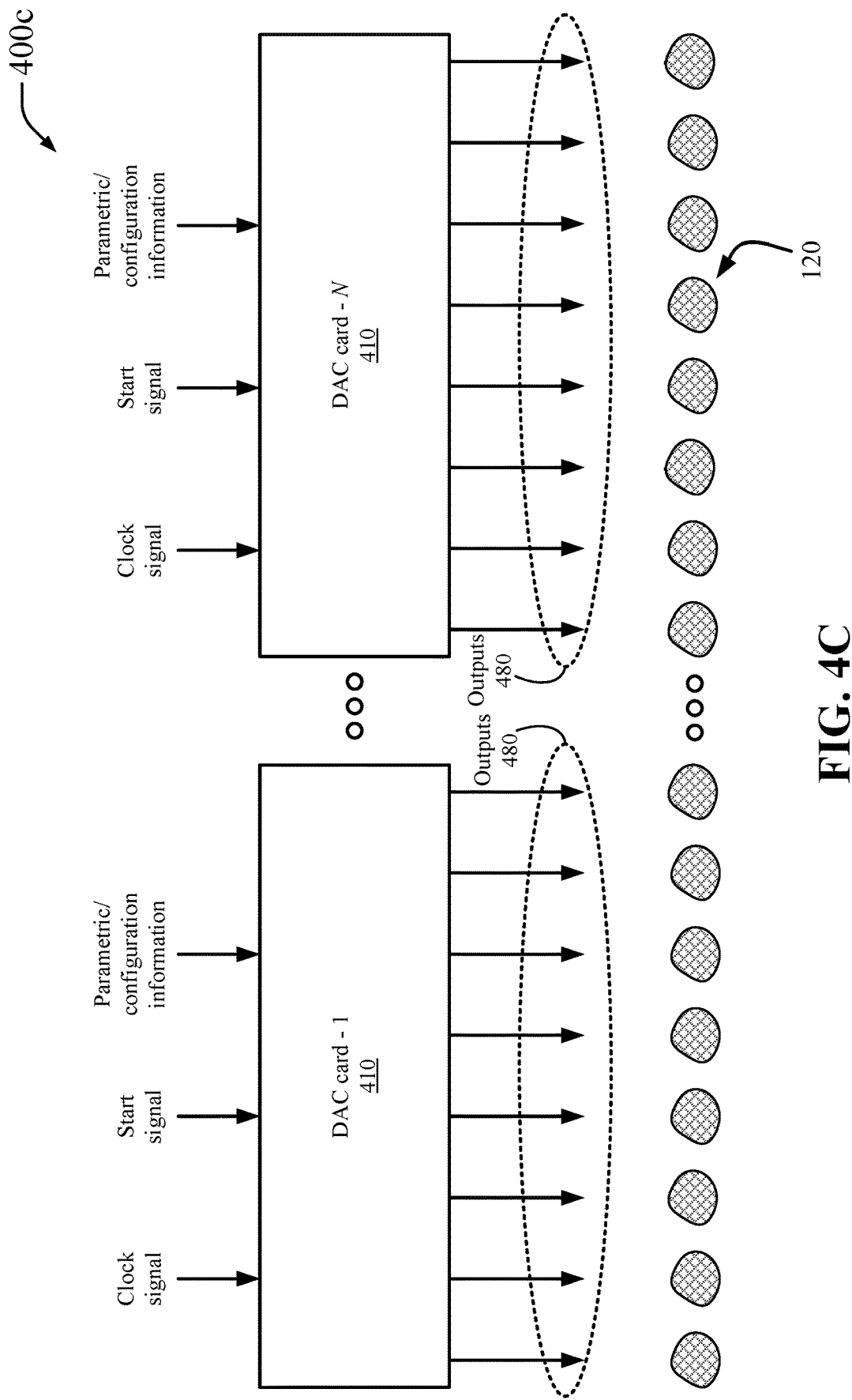
FIG. 4C illustrates an example of using multiple DAC cards to control operations of trapped atomic ions used as qubits in accordance with aspects of the disclosure.

FIG. 4C illustrates a diagram 400c that shows an example of using multiple DAC cards 410 to control operations of trapped atoms or atomic ions (e.g., atoms or atomic ions 120 in the diagram 100 in FIG. 1A) used as qubits in accordance with aspects of the disclosure. In this example, there are a number N of DAC cards 410 (e.g., DAC card 410-1, ..., DAC card 410-N) used in a QIP system, where N≥1. Each of the DAC cards 410 may be implemented or configured as shown in the diagram 400a in FIG. 4A, and each of the DAC cards 410 may have eight outputs 480. The outputs 480 are then provided to respective AOMs or to a multi-channel AOM to modulate laser or optical beams that are applied to the atoms or atomic ions 120. If the QIP system supports up to 32 atoms or atomic ions 120, then four (4) DAC cards 410 (N=4) may be used to provide the 32 outputs 480 that are needed. If the QIP system is scalable and the number of atoms or atomic ions 120 increases, then additional DAC cards 410 may be used to provide the appropriate number of outputs 480.

As described above, each of the DAC cards 410 receives a clock signal 421 (also referred to as a central or common clock signal) and a start signal 436 (also referred to as a central or common start signal). To enable proper synchronization across multiple DAC cards 410, these signals are provided by means of distribution networks that are part of the overall QIP system.

Figure 5A:
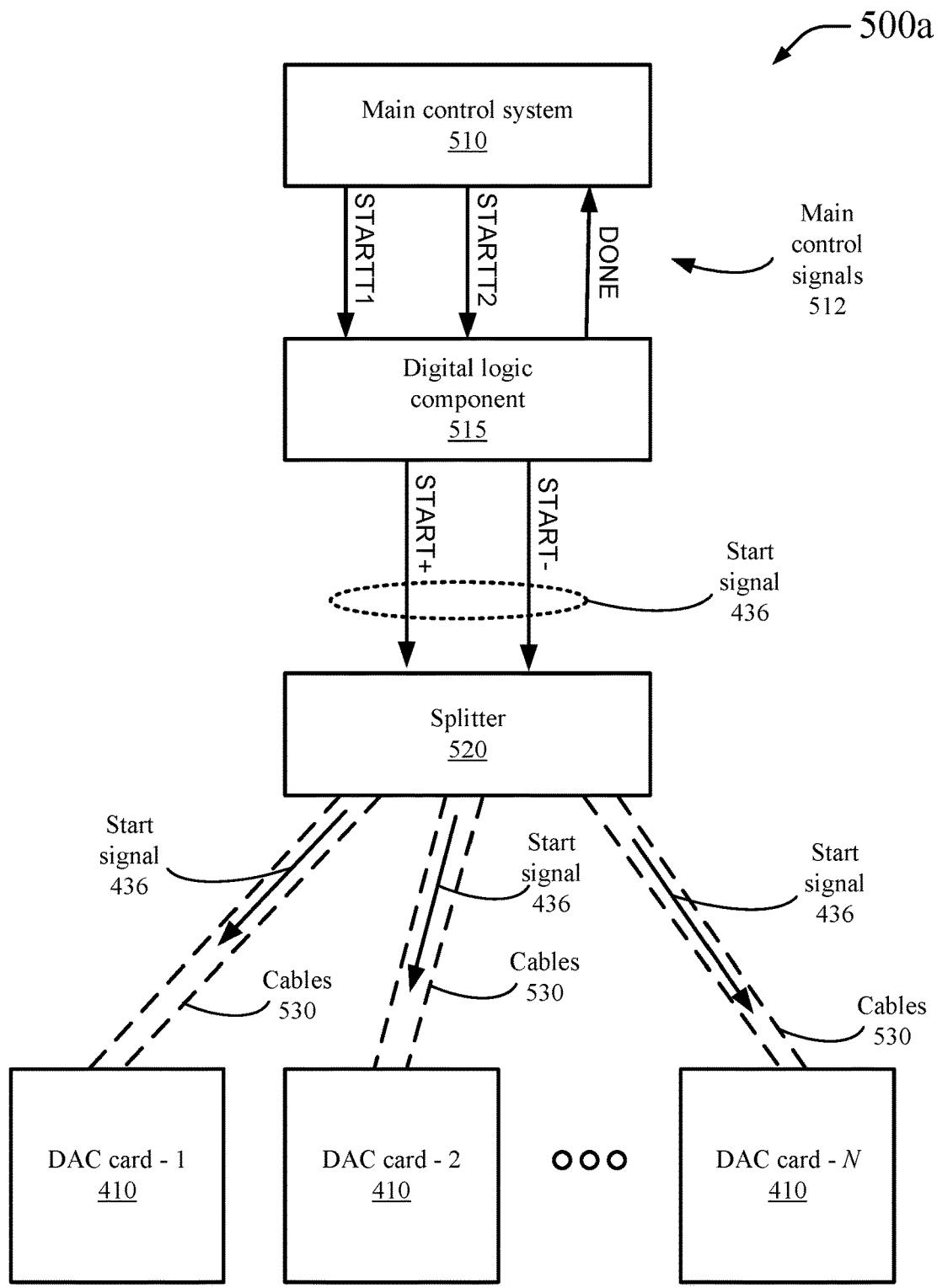
FIG. 5A illustrates an example of a start signal distribution network for multiple DAC cards in accordance with aspects of the disclosure.

FIG. 5A illustrates a diagram 500a that shows an example of a start signal distribution network for multiple DAC cards 410 in accordance with aspects of the disclosure. The diagram 500a shows a main control system 510 at the top of the start signal distribution network that exchanges main control signals 512 with a digital logic component 515. The main control signals 512 include a START1 signal and a START2 signal from the main control system 510 to the digital logic component 515, and a DONE signal from the digital logic component 515 to the main control system 510. The START1 signal and the START2 signal are used by the digital logic component 515 to produce a differential start signal 436 that has a START+ signal and a START-signal. The digital logic component 515 may be implemented using an FPGA. In one example, the digital logic component 515 may be implemented using a Xilinx Kintex7 FPGA.

The start signal 436 is provided by the digital logic component 515 to a splitter 520, which is configured to split the start signal 436 so that it is further provided to each of the DAC cards 410 (e.g., DAC card 410-1, ..., DAC card 410-N) used in a QIP system, where N≥1. The start signal 436 provided to each of the DAC cards 410 as described in the diagram 400a in FIG. 4A. Since there can be up to N DAC cards 410 in the QIP system, the splitter 520 may be referred to as a 1: N splitter. As mentioned above, one way to distribute the start signal 436 with good signal integrity and fast risetime is to use LVDS cabling, such as an LVDS over shielded twinaxial cable. Each of the cables 530 (dashed lines) shown in the diagram 500a may be LVDS-based cables to achieve the type of signal integrity and risetime needed to have the start signal 436 arrive at the various DAC cards 410 at the same time.

Figure 5B:
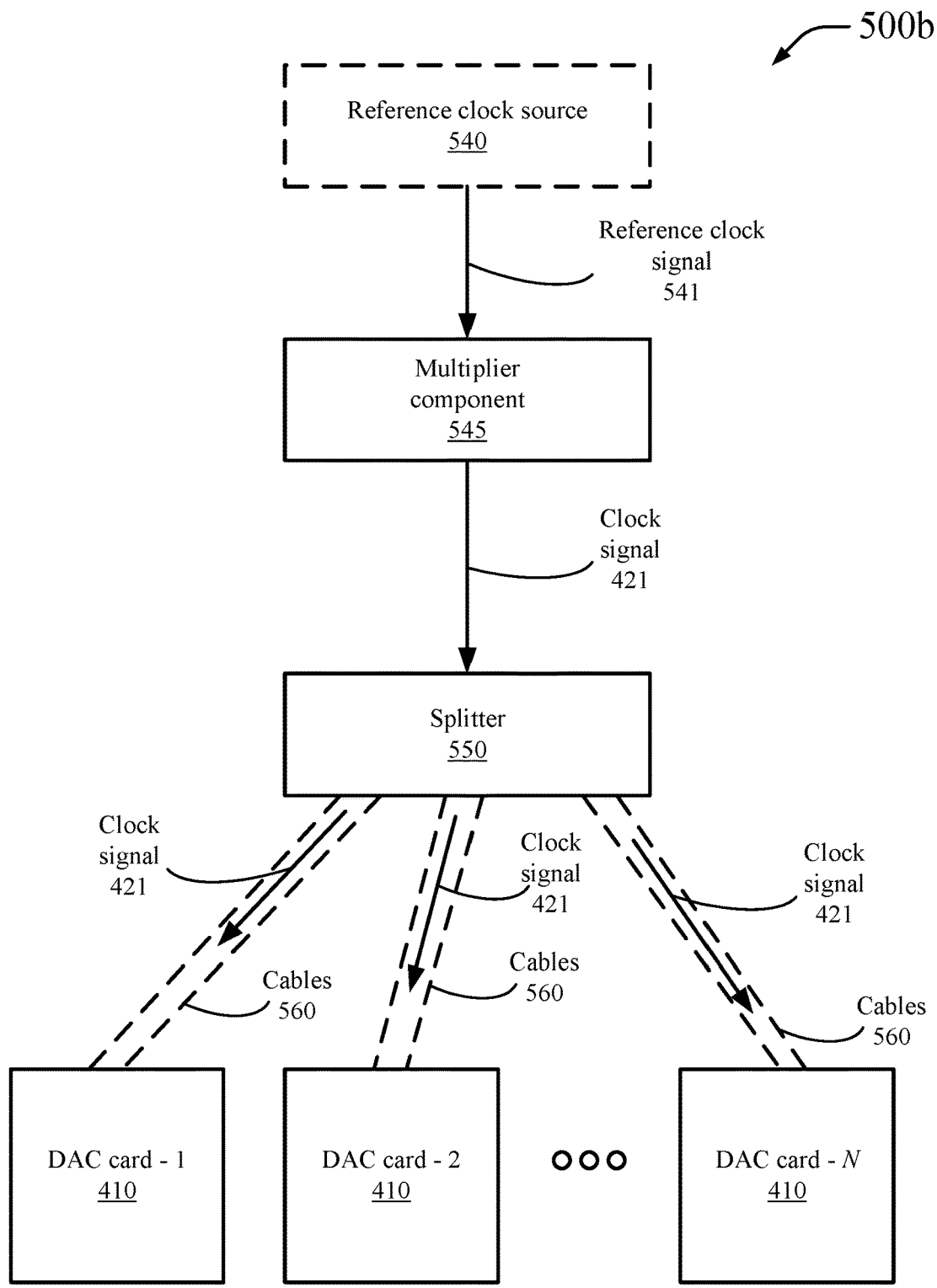
FIG. 5B illustrates an example of a clock distribution network for multiple DAC cards in accordance with aspects of the disclosure.

FIG. 5B illustrates a diagram 500b that shows an example of a clock distribution network for multiple DAC cards 410 in accordance with aspects of the disclosure. The diagram 500b shows a reference clock source 540 at the top of the clock distribution network that provides a reference clock signal 541 to a multiplier component 545. The reference clock source 540 may not be part of the clock distribution network but may be connected to the clock distribution network in order to provide the reference clock signal 541.

The multiplier component 545 may be configured to receive the reference clock signal 541 and to generate the clock signal 421 from the reference clock signal 541 using one or more multiplier stages. In one example, the multiplier component 545 may be a golden multiplied crystal oscillator (GMXO-PLD) from Wenzel Associates having one or more low noise multiplier stages to create signals in the range of 200 MHz to 12 GHz, for example.

In one example, the reference clock source 540 is an atomic clock source, the reference clock signal 541 is a 10 MHz signal, and the clock signal 421 produced by the multiplier component 545 is a 250 MHz signal.

The clock signal 421 is provided by the multiplier component 515 to a splitter 550, which is configured to split the clock signal 421 so that it is further provided to each of the DAC cards 410 (e.g., DAC card 410-1, . . . , DAC card 410-N) used in a QIP system, where N≥1. The clock signal 421 is provided to the divider/replicator device 420 in each of the DAC cards 410 as described in the diagram 400a in FIG. 4A. Since there can be up to N DAC cards 410 in the QIP system, the splitter 550 may be referred to as a 1: N splitter. As mentioned above, one way to accomplish having all of the DAC cards 410 see the rising edges of the clock signal 421 at the same time is through the use of coaxial cables that are all the same length. Each of the cables 560 (dashed lines) shown in the diagram 500b may be coaxial cables of the same length.

In addition to the aspects and techniques described above regarding synchronizing the DAC cards and their outputs, the present disclosure also describes aspects and techniques to enhance the representation of spline curves that are then used by DDSs to generate parametrized functions. This enhanced spline curve representation includes two ways to reuse sequences: (1) by subroutine calls, and (2) by conditional loop instructions.

In order to achieve this, instead of using one table, two tables are used (spline or function tables and instructions tables) as described above (see e.g., FIG. 4B). Rows in a spline or function table specify parameters like amplitude, phase, frequency, as well as the relative time that they should occur. Rows in an instructions table usually act as "subroutine calls" to some subsection of the spline table, but can instead act as loop iterators.

To save space, a single spline row (e.g., single row in a spline table) cannot specify all parameters. Each row has an opcode field to describe which of a known set of parameters it contains, e.g., frequency slope, initial phase, or amplitude acceleration. In a spline table, a "spline node" consists of many sequential spline rows. Rows that are not last for a spline node are marked in some way, perhaps a special bit that is always present, or a special value for a field that usually has some other purpose, e.g., all ones ("1") in a relative timestamp field. Moreover, not all fields are typically specified in most spline nodes. Unspecified fields either default to a static value like zero ("0"), or retain whatever value they had at the end of the previous spline node. This helps in achieving space compression. For example, when only wanting to specify nonzero values for the $0^{th}$ order and $2^{nd}$ order coefficients of an amplitude spline, and is perfectly fine to have the $1^{st}$ order and $3^{rd}$ order coefficients be zero ("0"), then the latter two coefficients may be omitted. In another example, when a single spline opcode allows more than one parameter to be specified in a same row, it may save space if the parameters are commonly used together.

In another aspect, it is sometimes useful for the instruction rows (e.g., rows in the instructions table) to have additional information, like modifiers to amplitude or phase that spline rows can specify.

In another aspect, the instructions in the instructions table may have an alternate "jump" variants that compare 1 of N counters to a constant. If equal or greater to the constant, then the operation falls through to the next instruction. Otherwise it increments the counter and then jumps to a user-defined row of the instructions table. Jump instructions do not cause a "subroutine call" into the spline table. Moreover, jump instructions may be distinguished from non-jump instructions by having a reserved bit in all instructions for that purpose or by using a special value.

In yet another aspect, there may be two (2) kinds of timestamps used in connection with the function or spline table and the instructions table. For example, each instruction row may use a global timestamp (e.g., a timestamp associated with tracking the time since experiment shot began), while each spline row has a narrower, relative timestamp (e.g., a timestamp associated with tracking the time since the spline subroutine began). However, only the last row's timestamp may be used to control execution time. Rows other than the last row can use the field for the timestamp to indicate something else, such as not being the last row, for example. The sum of the global timestamp and the relative timestamp need to exactly correspond to a current time, which is when a wide counter is cleared when the experiment shot began, for the first part of a spline subroutine to run.

The techniques described above provide a level of indirection when generating a spline function by using, in addition to the spline or function table, the instructions table to indicate how to reuse the spline table.

Figure 6:
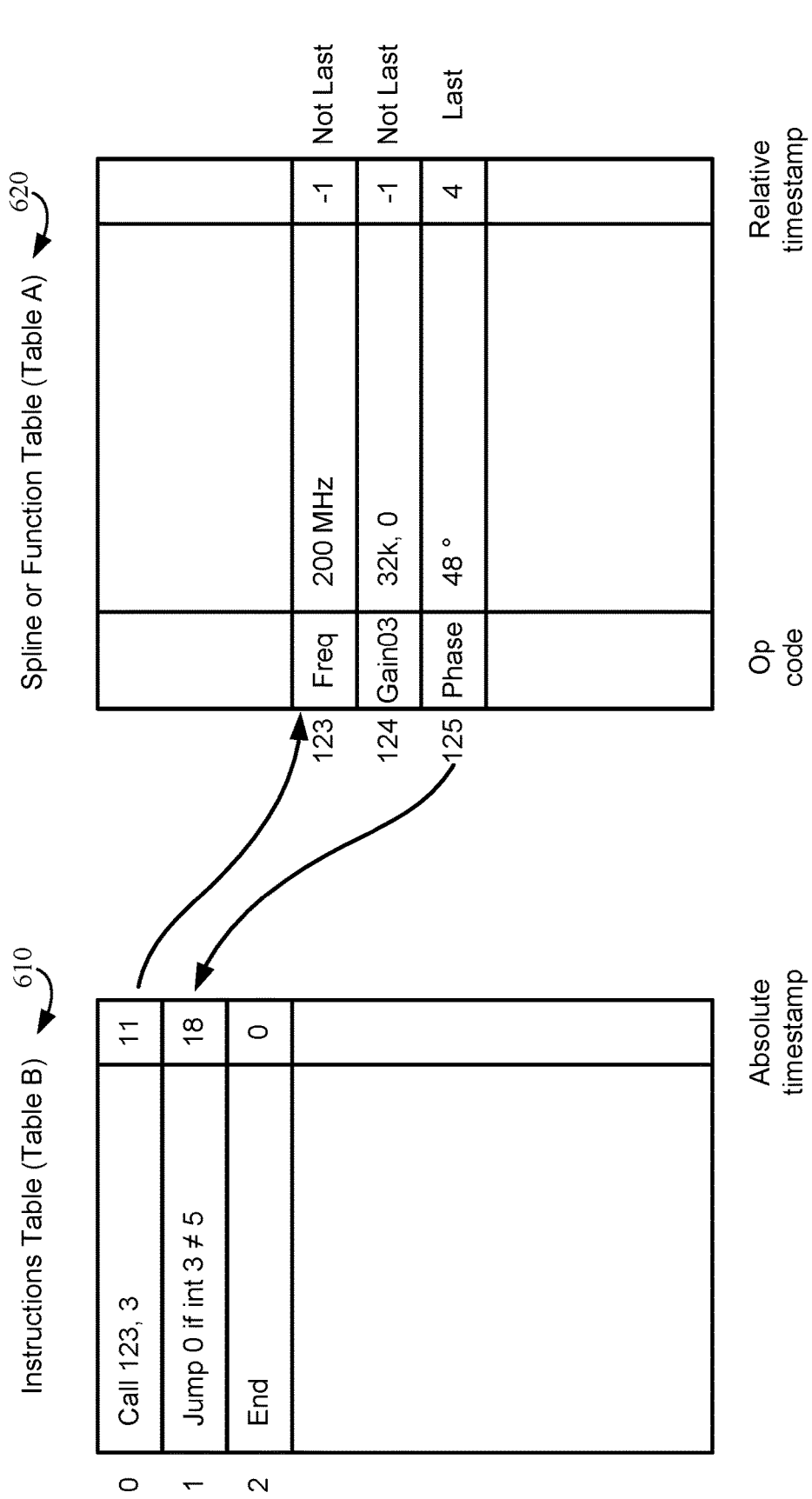
FIG. 6 illustrates an example of the combined operation of an instructions table and a function or spline table in accordance with aspects of the disclosure.

FIG. 6 illustrates a diagram 600 that shows an example of the combined operation of an instructions table 610 and a function or spline table 620 in accordance with aspects of the disclosure. The instructions table 610 may correspond to the instructions tables in the tables component 450 (see e.g., the diagrams 400a in FIGS. 4A and 400b in FIG. 4B), while the spline table 620 may correspond to the spline table in the tables component 450.

The instructions table 610 in this example has two parameters, a "call" and a "jump." The "jump," as described above, may be used for repeating in the instructions table, compare an arbitrary number of counters against the value that is in the instruction, and increment if it is going to jump back and repeat. In this example, there is one "call," one "jump," and one "end" of a program instruction. The "end" is indicated by a "0" in a timestamp field (e.g., absolute timestamp), although it is also possible to use other fields or special values to indicate the "end" in the instructions table 610.

A difference between the "call" and the "jump" is indicated by a special value in a field. The field may be referred to as the "where to jump" field and may be, for example, a 12-bit field. In an example, the maximum value of the "where to jump" field may be reserved to indicate that it is a "jump" instead of a "call."

The "call" in this example calls for location "123" in the spline table 620 and is intended to return from the spline table 620 after three (3) rows. Thus, rather than using an explicit return in the spline table 620, it is possible to indicate in the "call" in the instructions table 610 how long is the subroutine.

To the right of the instructions table 610 is the corresponding timestamp (absolute timestamp), which is the time at which the "call" is to occur. If that is not the current time, it will wait for a large counter until it is the value "11" in the example. This value "11" is not the value that is going to be used, rather the engine that is running the operations of these tables will use the value "11" in the instructions table 610 and fetch a corresponding value from a relative timestamp field in the spline table 620 (e.g., third or right column in the spline table 620). The number "4" in the third column of the spline table 620 is added to the "11" to get "15", which is the combined time value provided by the absolute and relative timestamps and which is the value used by the system to begin execution (e.g., executing begins at "15" ticks).

The spline table 620 has an "Op code" field (first or left column in the spline table 620) that indicates which parameter is being specified. This approach is in contrast to having a spline function or waveform defined by streaming from a host and large amounts of memory are needed, as the intent here is to compress contents in the table as much as possible so fewer bits of memory are used to represent common operations, parameters, or the like. For example, in the first row shown for the spline table 620 (e.g., line "123"), a single row may be used to specify a frequency value, in this case "200 MHz". In another example, in the second row shown for the spline table 620 (e.g., line "124"), a single row may be used to specify values for a zero order and a third order of a gain parameter. For gain parameter, the zero order is referred to as the starting point, a first order is referred to as the slope, a second order is referred to as the acceleration, and the third order as the jerk. In this example, the second row identifies the values of the zero order or starting point as "32 k" and the third order or jerk as "0" (e.g., there is no jerk). In another example, a third row in the spline table 620 a phase value of "48°" is also specified. The "−1" in the right column (e.g., the relative timestamp) in the first and second rows of the spline table 620 indicates that these rows are not the last rows of a subroutine. A bit field or some special value may have also been used to indicate that a row is not a last row.

In general there will be many groups of rows that go together and they are part of something that happens at the same time in the spline table 620. That is, the multiple modifications that take place in a same group of rows occur on a same clock cycle. All the commands are therefore flattened into the last one.

The only one of these rows that is of relevance regarding timing is the last one with the value "4" (e.g., line "125"). The engine that is running the table operations runs through the various rows until it gets to line "125", the one row without a "−1" in the relative timestamp. The engine accumulates all the commands up until the last row and expands out all of the commands operations that are to occur at the appropriate time. Any parameters not specified in the various rows may default to zero values and/or to previous values, according to how the system is set up to operate.

In addition to the various aspects described above, another aspect of this disclosure involves adding features to the instructions table that allow resetting the embedded DDSs (e.g., the DDSs in the DDS component 430) with fine granularity. This may be useful when implementing pulse boundaries. For example, each non-jump instruction location may have a bit flag (e.g., a "resync" bit flag) that causes the DDS to be told to reset its internal phase accumulator when the instruction's global timestamp and relative timestamp match the current time of day.

In this regard, the instructions table 610 may include another column, e.g., a single bit field, which may be renumbered by the engine running the tables when it gets to the execution time and one of the things that may be done is to clear out the phase accumulators for the DDSs. That is, when the execution time finally arrives (e.g., added value is "15" in the example in the diagram 600 in FIG. 6), the engine may not only indicate to the respective DDS to clear out its internal phase to "0°" but to set it to the phase shown in line "125", that is, set its phase to "48°" instead.

In yet another aspect, it may also be possible to modify some parameters outside of the spline mechanism outlined above so that the parameters may be scaled globally without needing to download or update new splines for the signal generator (e.g., DDS) of a particular atom or atomic ion. One example of such a modification may be to calibrate the optical power seen by an atom or atomic ion. It may be desirable to change the electrical amplitude after every "shot" of every experiment, so that it is possible to track changes to brightness with as little lag as possible. Techniques that increase bandwidth in a controlled loop may be used to lower latency so that fast changes in brightness may be tracked without misses.

For example, since DDSs typically operate at full scale, any smaller value may be achieved by a multiplication or scaling after the parametrized function is provided by the DDS. If the DDS is implemented in an FPGA or ASIC, it may include multipliers to perform such a function. If not, then external multipliers may be needed. In either case, a multiplier may be used for adjusting parameters in the instructions table 610, a different multiplier may be used for adjusting parameters in the spline table 620, and/or a global multiplier may be used for adjusting parameters from either or both tables.

Although the example shown in the diagram 600 in FIG. 6A has been described in connection with parameters for the waveform or parametrized function generated by a DDS, each pair of tables (e.g., the instructions table 610 and the spline table 620) may be used to control operations of more than one DDS. In such a case, additional fields or columns may be used to indicate which of the multiple DDSs being supported is being controlled.

Figure 7:
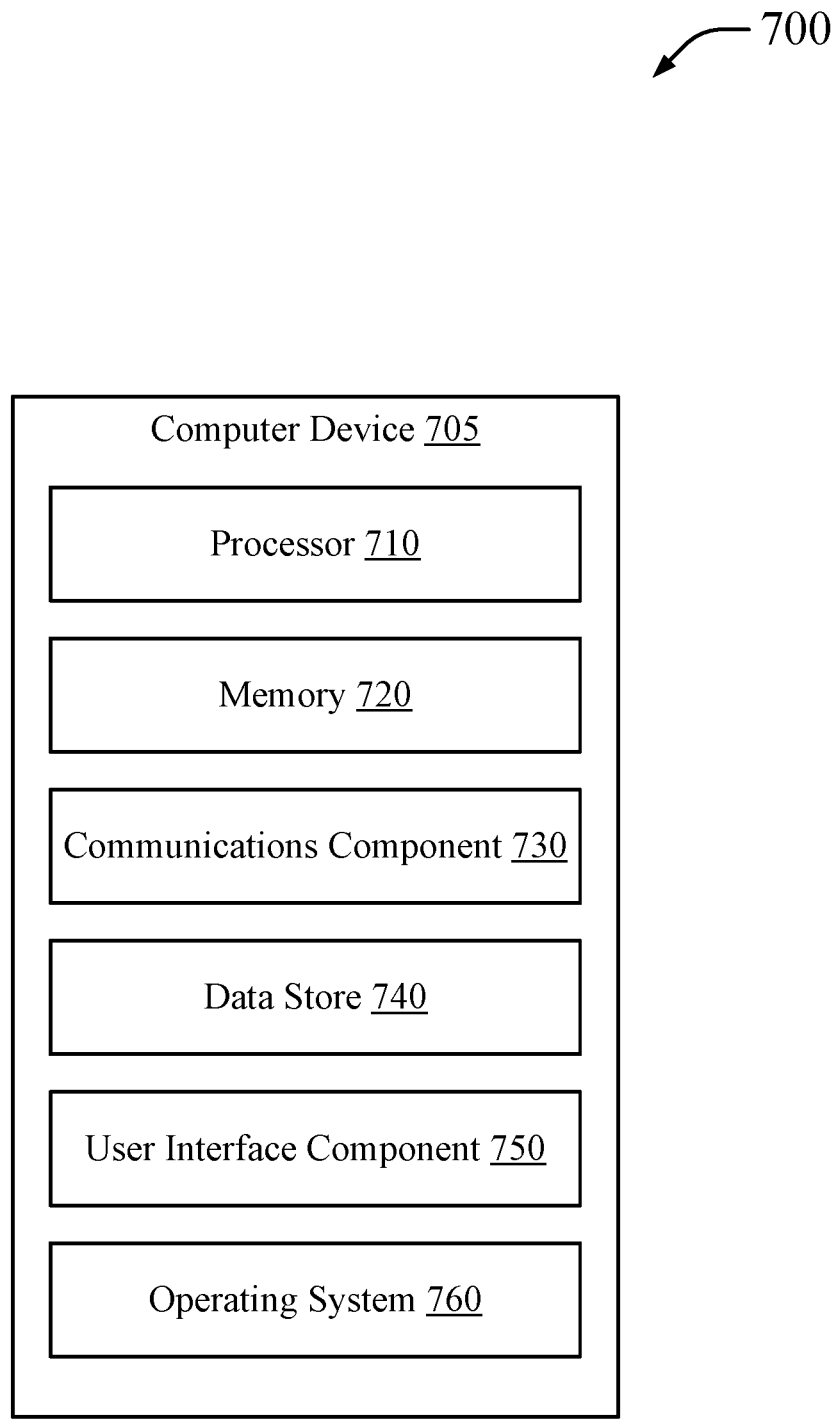
FIG. 7 is a diagram that illustrates an example of a computer device in accordance with aspects of this disclosure.

FIG. 7 is a diagram 700 that illustrates an example of a computer device 705 in accordance with aspects of this disclosure. The computer device 705 may be used to implement aspects of scalable and programmable coherent waveform generators for QIP systems. In one example, the computer device 700 may include a processor 710 for carrying out processing functions associated with one or more of the features described herein. For example, the computer device 705 may be used to control and/or manage operations of the DAC cards 410, the distribution networks in the diagrams 500a and 500b, and/or the tables 610 and 620 described above in connection with FIGS. 4A-6. The processor 710 may include a single or multiple set of processors or multi-core processors. Moreover, the processor 710 may be implemented as an integrated processing system and/or a distributed processing system. The processor 710 may include a central processing unit (CPU), a quantum processing unit (QPU), a graphics processing unit (GPU), or combination of those types of processors. In one aspect, the processor 710 may refer to a general processor of the computer device 705, which may also include additional processors 710 to perform more specific functions.

In an example, the computer device 705 may include a memory 720 for storing instructions executable by the processor 710 for carrying out the functions described herein. In an implementation, for example, the memory 720 may correspond to a computer-readable storage medium that stores code or instructions to perform one or more of the functions or operations described herein. In one example, the memory 720 may include instructions tables and spline tables. Just like the processor 710, the memory 720 may refer to a general memory of the computer device 705, which may also include additional memories 720 to store instructions and/or data for more specific functions.

Further, the computer device 705 may include a communications component 730 that provides for establishing and maintaining communications with one or more parties utilizing hardware, software, and services. The communications component 730 may carry communications between components on the computer device 705, as well as between the computer device 705 and external devices, such as devices located across a communications network and/or devices serially or locally connected to computer device 705. For example, the communications component 730 may include one or more buses, and may further include transmit chain components and receive chain components associated with a transmitter and receiver, respectively, operable for interfacing with external devices.

Additionally, the computer device 705 may include a data store 740, which can be any suitable combination of hardware and/or software, that provides for mass storage of information, databases, and programs employed in connection with implementations described herein. For example, the data store 740 may be a data repository for operating system 760 (e.g., classical OS, or quantum OS). In one implementation, the data store 740 may include the memory 720.

The computer device 705 may also include a user interface component 750 operable to receive inputs from a user of the computer device 705 and further operable to generate outputs for presentation to the user or to provide to a different system (directly or indirectly). The user interface component 750 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 750 may include one or more output devices, including but not limited to a display, a speaker, a haptic feedback mechanism, a printer, any other mechanism capable of presenting an output to a user, or any combination thereof.

In an implementation, the user interface component 750 may transmit and/or receive messages corresponding to the operation of the operating system 760. In addition, the processor 710 may execute the operating system 760 and/or applications, programs, or algorithms, and the memory 720 or the data store 740 may store them.

When the computer device 705 is implemented as part of a cloud-based infrastructure solution, the user interface component 750 may be used to allow a user of the cloud-based infrastructure solution to remotely interact with the computer device 705.

Figure 8:
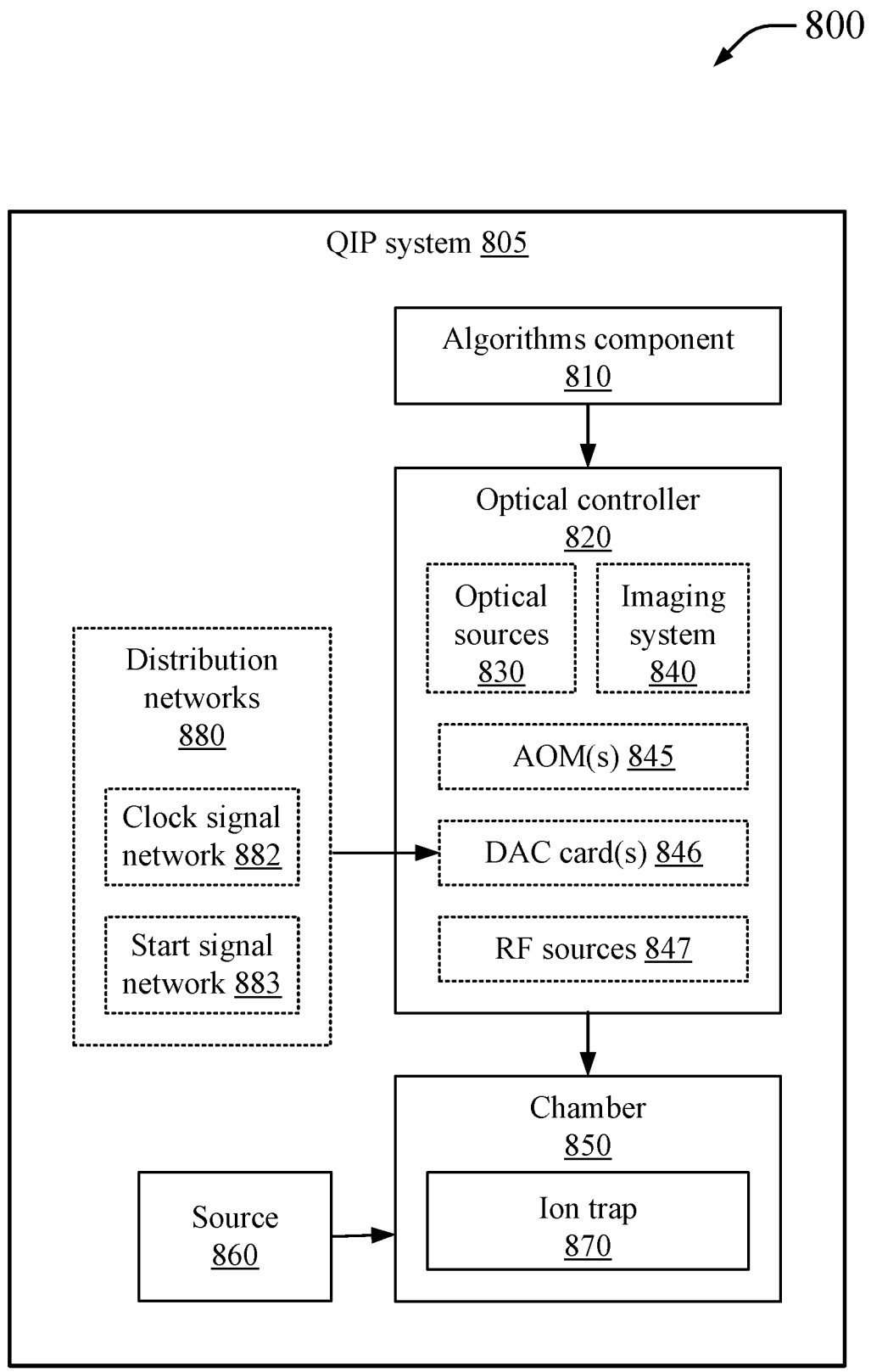
FIG. 8 is a block diagram that illustrates an example of a QIP system in accordance with aspects of this disclosure.

FIG. 8 is a block diagram 800 that illustrates an example of a QIP system 805 in accordance with aspects of this disclosure. The QIP system 805 may also be referred to as a quantum computing system, a quantum computer, a computer device, or the like. In an aspect, the QIP system 805 may correspond to portions of a quantum computer implementation of the computer device 705 in FIG. 7.

The QIP system 805 can include a source 860 that provides atomic species (e.g., a flux of neutral atoms) to a chamber 850 having an ion trap 870 that traps the atomic species once ionized (e.g., photoionized) by an optical controller 820. The ion trap 870 may be used to trap ions in a crystal (as illustrated in the diagram 100a in FIG. 1A). Optical sources 830 in the optical controller 820 may include one or more laser or optical beam sources that can be used for ionization of the atomic species, control (e.g., phase control) of the atomic ions, for fluorescence of the atomic ions that can be monitored and tracked by image processing algorithms operating in an imaging system 840 in the optical controller 820, and/or to perform other optical control functions associated with the techniques described herein. In an aspect, the optical sources 830 may be implemented separately from the optical controller 820.

The imaging system 840 can include a high resolution imager (e.g., CCD camera) for monitoring the atomic ions while they are being provided to the ion trap or after they have been provided to the ion trap 870. In an aspect, the imaging system 840 can be implemented separate from the optical controller 820, however, the use of fluorescence to detect, identify, and label atomic ions using image processing algorithms may need to be coordinated with the optical controller 820.

The acousto-optic modulator(s), AOM(s) 845, may be used to perform modulation of laser or optical beams produced by the optical sources 830. In this regard, the optical controller 820 may also include DAC card(s) 846, which may be examples of the DAC cards 410 described above, and which may be used to generate outputs to drive radio frequency (RF) sources 847 to modulate the AOM(s) 845.

The QIP system 805 may also include an algorithms component 810 that may operate with other parts of the QIP system 805 (not shown) to perform quantum algorithms or quantum operations, including single qubit operations or multi-qubit operations as well as extended quantum computations. As such, the algorithms component 810 may provide instructions to various components of the QIP system 805 (e.g., to the optical controller 820) to enable the implementation of the quantum algorithms or quantum operations, and consequently, implement the various techniques described herein.

The QIP system 805 may also include distribution networks 880, which may include a clock signal network 882 corresponding to the distribution network described above in connection with the diagram 500b in FIG. 5B, and a start signal network 883 corresponding to the distribution network described above in connection with the diagram 500a in FIG. 5A. The distribution networks 880 may be used to provide common signals to multiple of the DAC cards 486 and/or to other parts of the QIP system 805.

Although the present disclosure has been provided in accordance with the implementations shown, one of ordinary skill in the art will readily recognize that there could be variations to the embodiments and those variations would be within the scope of the present disclosure. Accordingly, many modifications may be made by one of ordinary skill in the art without departing from the scope of the appended claims.

What is claimed is:

1. A digital-to-analog converter (DAC) card for controlling qubits in a quantum information processing (QIP) system, comprising:
   a digital logic component having:
      at least one direct digital synthesizer (DDS) for one or more outputs of the DAC card, wherein the one or more outputs control respective optical beams for qubits of the QIP system;
      a function table that defines a parametrized function to be generated by the at least one DDS; and
   at least one DAC component configured to receive the parametrized function generated by the at least one DDS to generate the one or more outputs, the parametrized function being in a digital form and the one or more outputs each being in an analog form,
   wherein the parametrized function defined by the function table comprises a spline curve formed of a plurality of segments, and
   parameters for each segment of the plurality of segments include one or more of an amplitude, a phase, or a frequency.

2. The DAC card of claim 1, wherein the function table includes a plurality of spline nodes, and each spline node includes parameters for defining a respective segment of the plurality of segments of the spline curve.

3. The DAC card of claim 2, wherein each spline node includes one or more sequential rows, and each row specifies a different parameter of the respective segment of the spline curve.

4. The DAC card of claim 3, wherein each row has an identifier that identifies the different parameter that is being defined by the respective row.

5. The DAC card of claim 3, wherein an end of each spline node is identified in a last row of the one or more sequential rows of the spline node.

6. The DAC card of claim 5, wherein each row of the spline table includes a timestamp field, and the explicit identification in the last row is made in the respective timestamp field.

7. The DAC card of claim 1, further comprising an instructions table that defines at least one of subroutine calls to the function table or conditional loop instructions for the function table.

8. The DAC card of claim 7, wherein the instructions table includes instructions to modify one or both of the amplitude or phase parameters.

9. The DAC card of claim 7, wherein the instructions table includes one or more jump instructions that each are configured to compare one of N counters to a constant, if equal or greater falling through to a next instruction, otherwise incrementing the counter and jumping to a user-defined row of the instructions table.

10. The DAC card of claim 9, wherein the one or more jump instructions are distinguishable from other instructions in the instructions table by having a reserved bit or by using a special value.

11. The DAC card of claim 9, wherein for instructions in the instructions table that are different from jump instructions, a bit flag resync is configured to cause the one or more DDSs associated with that instruction table to reset an internal phase accumulator at boundaries of the parametrized function.

12. The DAC card of claim 11, wherein the reset of the internal phase accumulator occurs when a value of a global timestamp field in the instructions table and a value of a relative timestamp field in the function table match a current time of day.

13. The DAC card of claim 9, further comprising a clock divider/replicator device having an input SYNC pin, wherein the digital logic component is configured to receive a start signal that is used to assert the input SYNC pin of the clock divider/replicator device unless the start signal is masked by the digital logic component.

14. The DAC card of claim 13, wherein the digital logic component includes an asynchronous logic component that is configured to receive the start signal and generate another signal to assert the input SYNC pin of the clock divider/replicator device.

15. The DAC card of claim 7, wherein the instructions table includes rows having a global timestamp field for tracking operations from a start of an experiment shot, and the function table includes rows having a relative time stamp for tracking operations associated with a spline node of a spline curve defining a respective segment of the parametrized function.

16. The DAC card of claim 15, wherein a current time for the spline node to run is a sum of a value of the global timestamp and a value of the relative timestamp.

17. The DAC card of claim 1, wherein the amplitude is defined by one or more of a starting point or zero order, a slope or first order, an acceleration or second order, or a jerk or third order.

18. The DAC card of claim 1, wherein the at least one DAC component comprises the one or more outputs of the DAC card.

* * * * *